May 20, 1958 E. M. WILLIAMS 2,835,785
APPARATUS FOR SPARK MACHINING
Filed Jan. 3, 1955 5 Sheets-Sheet 1

Inventor
Everard M. Williams
Carlson, Pitzner, Hubbard & Wolfe
Attorneys

May 20, 1958  E. M. WILLIAMS  2,835,785
APPARATUS FOR SPARK MACHINING
Filed Jan. 3, 1955  5 Sheets-Sheet 2

Inventor
Everard M. Williams
Carlson, Pitzner, Hubbard, & Wolfe
Attorneys

May 20, 1958  E. M. WILLIAMS  2,835,785
APPARATUS FOR SPARK MACHINING
Filed Jan. 3, 1955  5 Sheets-Sheet 3

Inventor
Everard M. Williams
Carlson, Pitzner, Hubbard
and Wolfe
Attorneys

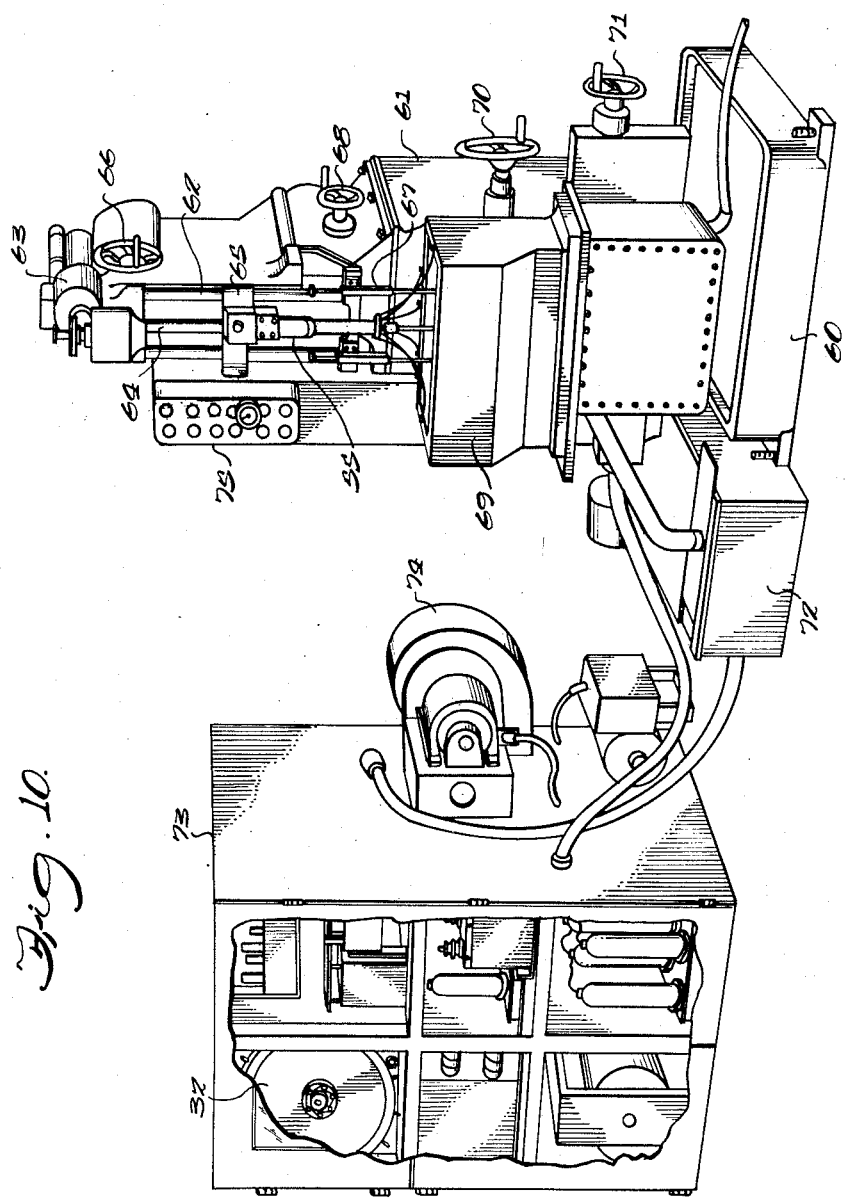

May 20, 1958     E. M. WILLIAMS     2,835,785
APPARATUS FOR SPARK MACHINING
Filed Jan. 3, 1955     5 Sheets-Sheet 5

United States Patent Office

2,835,785
Patented May 20, 1958

2,835,785

APPARATUS FOR SPARK MACHINING

Everard M. Williams, Pittsburgh, Pa., assignor, by mesne assignments, to Firth Sterling Inc., Pittsburgh, Pa., a corporation of Pennsylvania Application January 3, 1955, Serial No. 479,472

17 Claims. (Cl. 219—69)

This application is a continuation-in-part of my previous application Serial No. 256,322, filed November 14, 1951, and now abandoned.

This invention relates to the method and apparatus for electrically dislodging particles from a conductive workpiece by a series of over-voltage initiated short time-spaced spark discharges through a liquid dielectric, the art of so removing materials being sometimes termed "spark cutting," "spark machining," or "spark erosion."

Spark cutting has found particular utility for machining extremely hard materials such as tungsten and other carbides, hard steel alloys and the like. For tungsten carbide, particularly, this method has been proven many times faster than the conventional machining methods employing diamonds or diamond dust, and has made possible many machining operations which could not otherwise be performed. Various other advantages are inherent in this type of machining. Thus heat treatment problems are minimized as the workpiece need not be materially heated by the spark machining nor is the spark machining effectiveness itself affected by the state of heat treatment of the workpiece. Another is the simplicity and inexpensive construction of the shaping tool, since it serves entirely as a noncontacting electrode, while the sparks do the work of dislodging workpiece particles or chips.

The speed of cutting or removal is a primary measure of success of spark machining, for, assuming given standards of accuracy and quality of finish, it is the utility of rapid cutting or material removal which transforms spark erosion from a scientific curiosity to an important industrial tool. To this end, the spark power is sought to be increased, higher current sparks at a greater repetition rate producing faster machining. Capacitive energy storage means have been found particularly useful for storing large amounts of energy for discharge as sparks across the continually maintained gap between the electrode tool and the workpiece. Reference is made to U. S. Patent 2,650,979 issued September 1, 1953, on the application of Edmund E. Teubner and assigned to the assignee of this application for disclosure of a typical prior art apparatus in which the charging voltage on a capacitor connected across the spark gap rises high enough to ionize the gap and discharge the capacitor at a repetition rate subject to the time constant of the charging circuit. Problems have arisen in increasing both the rate and uniformity of charge and discharge of such storage means, particularly in view of the fact that in order to preserve the identity of spark machining and the previously mentioned advantages peculiarly inherent therein, operational requirements and control of such spark producing systems differ greatly from those of capacitor charging and discharging circuits generally.

These requirements are manifold. First, the sparks are preferably very short in time duration, being preferably in the order of a few microseconds or less, and have a very high current value so that a maximum amount of useful energy is provided in each spark. Then the sparks must be particularly polarized so that the rapid dislodgment of particles is from the workpiece rather than from the electrode tool. Successive sparks should also be equivalent in current and duration in order that the size and depth of the minute portions of the surface from which the material is dislodged can be controlled. At all times, of course, the identity of the spark must be preserved since degeneration of the spark into a heating arc could provide more energy only at the expense of the spark machining process as such.

It may be seen that these requirements for the cutting spark carry important consequences so far as the spark circuit is involved—the fact alone that the duration of the high current spark is controlled in terms of microseconds causes the small amount of inductance inherent in the circuit conductors to adversely affect the charging and discharging characteristics. The energy must be carefully directed to utilize what in conventional circuits are the largely unwanted and uncontrolled transient responses. These considerations are coupled with the inhibitions posed by such requirements as inundating the spark gap in a dielectric liquid and continuously controlling and correlating the spark gap spacing with the rate of material removal. The spark discharge through the dielectric liquid filled spark gap also presents an unusual load requirement in correlating efficient use of the electrical energy with the effectiveness of the sparking. Since the solution of the problems involved is directed to the industrial advantages following reduction of machining time to seconds from what had formerly required hours to accomplish, it is also required that the solution be embodied in apparatus which meets industrial standards for economy, safety of personnel, trouble-free operation, and minimum maintenance.

The general objectives of my invention are therefore to provide means for spark machining at an increased material removal rate and particularly an improved spark cutting equipment for industrial usage; to provide controlled rapid sparking for producing machined surfaces of a given quality of finish; and to provide a series of uniform polarized time-spaced sparks for dislodging particles from a conductive workpiece each of extremely short duration and high energy content and to correlate the control of the apparatus with the rate of material removal to provide greater efficiency or effective use of the apparatus.

More particularly, one important object of my invention is to provide in combination in a spark machining apparatus a timed pulse forming system. A related object is to provide in the pulse forming system a high voltage energy storage means and an independently timed discharge control. It is another object to provide in the timed pulse forming system a plurality of energy storage means which are continuously connected for charging and sequentially discharged, and a further object of my invention is to provide an improved discharge initiating control means for efficiently discharging a plurality of storage means at a rapid rate. It is also an object of my invention to provide energy storage means with predetermined pulse characteristics.

It is another important object of my invention to provide a charging network in combination with a timed pulse forming system for rapidly and efficiently charging the system from a power source. It is a further object of my invention to provide such a charging network for charging a plurality of energy storage means from a single source. It is another related object to charge the storage means to a voltage exceeding that of the power source and to prevent direct addition of the power source energy to the discharge energy from the timed pulse system.

It is still another important object of my invention to provide a discharge coupling network in combination with a timed pulse forming system for efficient application of the impulse energy to the spark gap defined by an electrode tool and a workpiece. It is an important object of the coupling means to provide means for unloading the pulse energy when the gap spacing is too large for sparkover. It is a further object to conductively separate the spark gap circuit from the timed pulse forming system, and a further related object to provide in the discharge coupling network a high voltage primary circuit and an inductively coupled high current secondary circuit. It is a related object to provide in the discharge coupling network means for damping the tendency for the spark discharge to oscillate and maintaining the polarity of the spark discharge. It is also an object to provide a discharge network having a very low inductance spark gap circuit.

It is an additional important object of my invention to control automatically the spark gap between the electrode tool and workpiece continuously for efficient use of the spark machining apparatus. It is a more particular object to derive a control signal for the electrode tool feed particularly related to the timed pulse forming system. It is likewise an object to provide means for automatically insuring the maintenance of the spark gap at a predetermined optimum spacing as measured by the utilization of the applied impulse.

The objects of the invention thus generally set forth together with other objects and ancillary advantages are attained by the construction and arrangement shown by way of illustration in the accompanying drawings, in which.

Figs. 5A, 5B, 5C, and 5D are graphic representations of the voltage and current variations with time upon application of a given voltage impulse to a spark gap under different spacing conditions.

Figure 6:
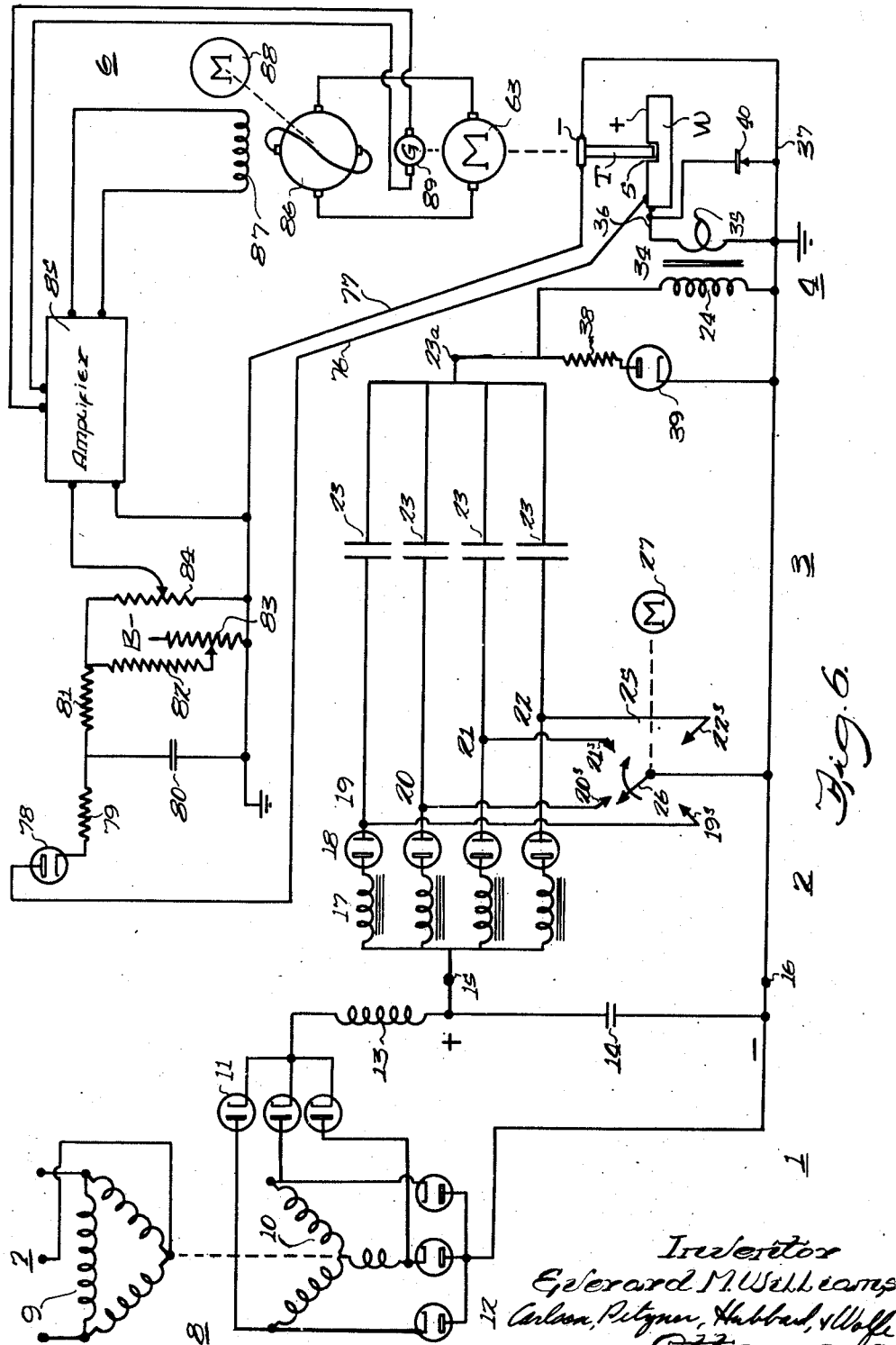

Fig. 6 is a schematic representation of the electrical components of a preferred embodiment of an apparatus incorporated in the invention.

Figure 7:
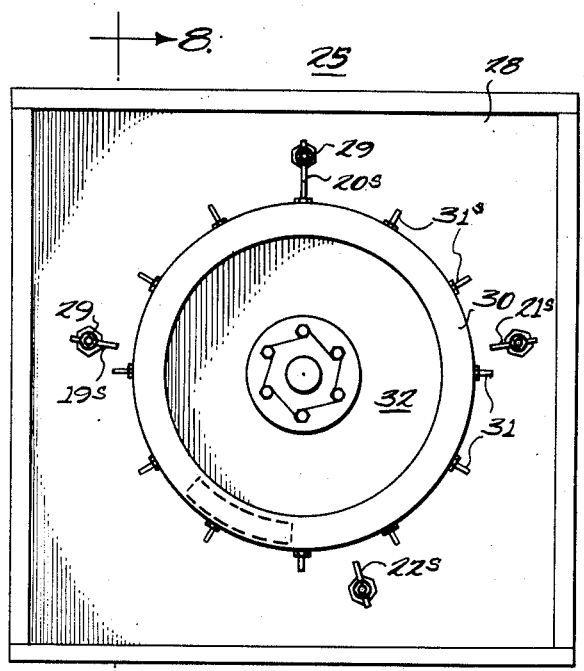

Fig. 7 is a front elevation of a spark gap switch suitably employed in the circuit of Fig. 6.

Figure 8:
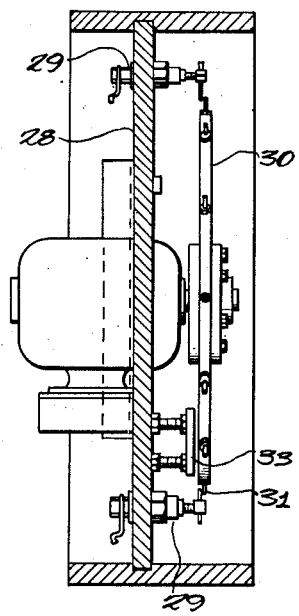

Fig. 8 is a sectional view along line 8—8 of Fig. 7.

Figure 9:
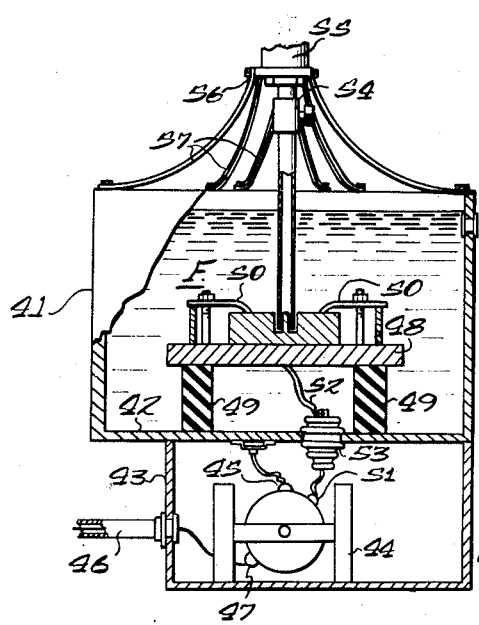

Fig. 9 is a view partly in section of the work tank and pulse transformer mounting arrangement for the apparatus.

Fig. 10 is a perspective view showing the mechanical arrangement of apparatus incorporating my invention and including the preferred embodiment of the electrical components shown in Fig. 6.

Fig. 11 is a view of the details of a current responsive gap spacing control system analogous to the voltage responsive system shown in Fig. 6.

Fig. 12 is a circuit diagram of the multiple energy storage means showing simple capacitors as alternatively available in apparatus such as represented by the circuit of Fig. 6; and Fig. 13 is a schematic representation of the electrical components of a second embodiment of an apparatus incorporating the invention.

While the invention is susceptible of various modifications and alternative constructions, there is shown in the drawings and will be herein described in detail certain preferred embodiments, but it is not thereby intended to limit the invention to the specific forms disclosed. On the contrary, the intention is to cover all modifications, equivalents, and alternative constructions falling within the spirit and scope of the invention, as expressed in the appended claims.

GENERAL ARRANGEMENT

Figure 1:
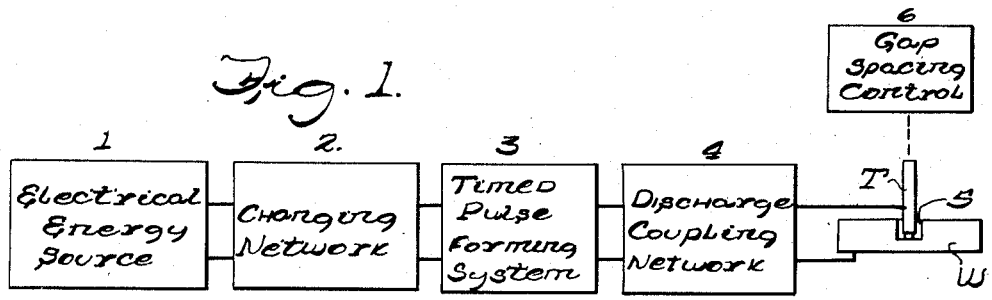
Figure 1 is a block diagram setting forth the general arrangement of apparatus embodying my invention.

Reference is first made to Fig. 1 in which the block diagram sets forth the general arrangement of apparatus embodying my invention for the purpose of assisting in the understanding of the organization and operation of the particular embodiments subsequently described. The novel and distinctive manner in which the operational requirements are met by my invention may also be better appreciated by first considering the apparatus generally.

As shown in the figure a source of electrical energy 1, whose size and form are for the most part determined by a number of factors including convenience and cost, as well as the particular requirements of the apparatus involved, is continuously connected through a charging network 2 to a timed pulse forming system 3. As subsequently explained, this system includes a capacitive-inductive pulse network and a discharge control or switch means. The energy thus derived from the source is discharged as a succession of very short time-spaced impulses. These impulses are uniform in amplitude and duration and also have a predetermined repetition rate. The discharge energy of the pulse forming system 3 is applied through a discharge coupling network 4 to a spark gap 5 as a voltage pulse.

This functional system analysis, made for the purpose of facilitating definition of the invention, does not, of course indicate that the parts of the system are separate and independent. Indeed, in the following portions of the specification describing the preferred embodiment and setting forth its operation, the manner in which the various functional parts of the system are interrelated and cooperate to produce the end result is thereby more clearly set forth.

The spark gap is defined between two opposing electrodes, one being the conductive workpiece W and the other being the electrode tool T. The spark gap itself is inundated with the dielectric fluid F. When as a result of the application of the metered impulses to the gap the dielectric medium F is temporarily ionized to permit the passage of a spark-over current, the spark effectively removes a minute particle or particles of the workpiece. The impulse energy is effectively polarized through the discharge coupling network 4 so that the electrode tool T is the cathode or negative electrode with respect to the anode or positive workpiece W. The spacing of the spark gap, that is, the minimum distance between the electrode tool and the workpiece surface to be machined, is maintained by the gap spacing control means 6. It will be appreciated that as each spark occurs across the narrowest portion of the gap to remove some of the workpiece material, the gap spacing is thereby increased and the electrode tool must be fed or moved relative to the workpiece to maintain the spark gap spacing within the range in which the sparking action is most effective.

Figure 2:
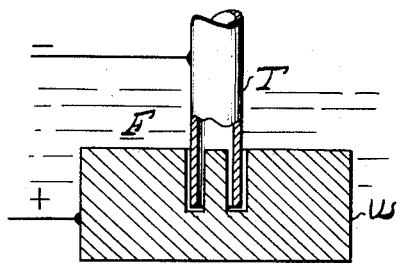
Fig. 2 is a semi-schematic representation of one form of electrode tool and workpiece for "inside" machining with the apparatus of Fig. 1.
Figure 3:
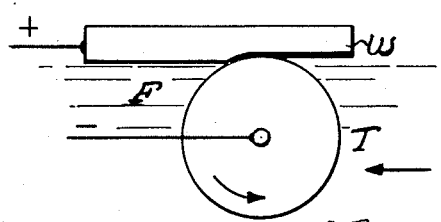
Fig. 3 is a semi-schematic representation of an electrode tool and workpiece arranged for "outside" machining with the apparatus of Fig. 1.

Referring particularly to Figs. 2 and 3, a better understanding of the spark gap itself may be gained. The specific form of the electrode tool and the workpiece may vary widely; thus, as shown in Fig. 2, the electrode tool T is a hollow tubular section or cylinder which is designed to be axially fed into the workpiece to thus "bore" a hole having a diameter corresponding to that of the electrode tool but increased by the machined clearance. At all times the electrode T is spaced from the workpiece W. In Fig. 2 the operation is shown as partially completed, the tool having advanced about half-way through the thickness of the workpiece W. While no forces of friction or mechanical reaction are involved, it will be recognized that the relative positions of the tool and workpiece should be carefully held since the machining will take place at any given instant across the narrowest part of the maintained gap. This active portion of the gap in Fig. 2 is designed to be the bottom surface of the tubular electrode T. A further indication of the nature of the action is indicated by the fact that with the use of the hollow tool, an inner core of the workpiece material is left upstanding. The machining process can be considered as producing either the hole or the core and may extend all the way through the workpiece or the hole may be "blind" and extend only a partial distance into the workpiece. So long as a simple rectilinear movement of the tool is employed, the cross section of the tool may be of any desired configuration, a splined outline or any other noncircular outline being as readily produced as a cylindrical bore. If rotational movement is added, the tool may be employed to provide internal or external threads by providing a threadlike contour or thread portion on the exterior or the interior surface of the tool. The use of spark machining apparatus for tapping or threading is further described in the previously mentioned Teubner Patent 2,650,979.

Fig. 3, on the other hand, illustrates another application in terms of the nature of the electrodes forming the spark gap in that the electrode tool T takes the form of a wheel or disk which is rotated and translated along a surface of the workpiece W to machine the surface. Unlike a conventional grinder, the wheel at all times is separated from the workpiece by the amount of the spark gap spacing.

For purposes of illustrating the various possible postures of the spark gap electrodes, in this case the tool T is shown under the workpiece W, the gap again being flooded with the dielectric fluid F. In each case, however, the workpiece W is the positive electrode and the tool is the negative electrode during the spark discharge. Whether the operation is an "inside" machining type as shown in the boring type of operation of Fig. 2 or "outside" machining type as shown in Fig. 3, it is to be understood that any conventional representation of the machining spark gap is not limited to either operation. Likewise, it may be seen that controlled material removal machining operations variously described as boring, grinding, sawing, or planing, to name a few, have their counterparts in spark machining apparatus so far as the machining results obtained are concerned.

In typical apparatus, the electrode tool T of Figs. 2 and 3 is made of a relatively soft material such as brass which is found not only to have desirable electrical characteristics, but is also readily shaped by conventional machine or hand tools. The workpiece W, while it may be any conductive material, is for most purposes most profitably one of the very hard metals, tungsten carbide being a prime example. Alloy steels, especially those having heat treatments which either make the metal too hard to otherwise easily work are also very advantageously machined by spark machining methods. Many present practical applications of spark machining are directed to the production of dies or of tools for cutting by conventional methods. It is to be emphasized of course that it is not the relative hardness of the tool and the workpiece that is involved in successful spark machining, nor must the tool maintain a cutting edge by virtue of its own hardness. To the contrary, the electrode tool is conveniently made of the softer material which can be inexpensively shaped to correspond to special shape requirements of the harder workpiece metal.

The dielectric fluid F previously mentioned is important since it is through this fluid, supplied to the gap as a liquid, that an ionized current path is briefly maintained during the temporary disruptive breakdown upon sparkover. Kerosene or other low vapor pressure liquid hydrocarbons such as hexadecane, are preferred, kerosene particularly having auxiliary advantages of low cost, easy availability, adequate supply, relative safety, and non-oxidizing properties. The voltage required to initiate the discharge increases with increase in the spark gap length, and with kerosene of a given purity or cleanliness the voltage drop required to maintain the ionization during the spark discharge is in the vicinity of 30 volts. Practical spark gap lengths are small, being in the order of thousandths of an inch or less with brass cathode tools, and while the discharge peak current may be in the order of thousands of amperes, the discharge duration is preferably in the order of one or a few microseconds. The self-restoring liquid dielectric helps provide a controlled spark discharge not only readily initiated at relatively low voltages, but also readily deionized and thus terminated. During the brief period when the fluid in the spark path is ionized, it is believed to be converted to a high pressure gas of very high positive ion density and to thus maintain high current density. It additionally serves non-electrical functions such as conveying the entrained or suspended removed particles from the active spark gap region. Atmospheric air does not qualify as the dielectric fluid, and other gases similarly are not suitable for performing one or more of the required functions. As a matter of definition of the fluid selected, preferably a hydrocarbon, it should be understood that the dielectric characteristics are such as to prevent electrolytic conduction of high currents of the order of magnitude required for spark currents and that it has essentially liquid state properties as supplied to the gap.

GENERAL OPERATION AND THEORY

The dislodging of particles from the conductive workpiece by the spark action, as presently understood by the applicant, is best explained in terms of the electric field force produced by the spark current. Thus with the workpiece at a positive potential with respect to the electrode, the over-voltage initiated disruptive breakdown of the dielectric between them is the occasion for flow of electronic current to the workpiece (or, by the usual convention, positive current to the cathode tool). Considering the spark terminus on the surface of the workpiece as an approximate point source of current, the current densities at and just under the surface of the workpiece are very high. Due to the resistivity of the workpiece metal, a substantial electric field gradient along the current path in the workpiece near the surface receiving the spark is produced. This electric field gradient results in a force on the positive ions in the material. These positive ions are the atoms in the crystal lattice of the material less the associated orbital electrons which are free to move and provide the ordinary conduction properties of the material. The electrostatic forces on that volume of workpiece material thus positively charged tend to tear it away from the main body of the workpiece. The rupturing forces must overcome the tensile strength of the workpiece material to dislodge a particle and thus erode or machine the workpiece.

The size of the fragment thus dislodged is limited by the decrease in current density with distance from the point current source on the workpiece surface. Neglecting skin effect, which is not large in the nonferrous or nonmagnetic conductors, the current density $J_r$ at any distance $r$ from a point current source on the workpiece surface ($I$ being the current) is:

$$J_r = \frac{I}{2\pi r^2}$$

Assuming a given critical current density, $J_c$, is required for removal of a workpiece fragment of given tensile strength material, the radius of which this current density exists will therefore be:

$$r = \sqrt{\frac{I}{2\pi J_c}}$$

From this equation the radius, taken from the center of the ionized path, of the crater that occasioned the dislodgment of a work piece fragment is proportional to the square root of the spark current.

The field force on the ions in the lattice of the electrode tool cathode is directed into its surface rather than away from it so that the tool is not subjected to the same rupturing forces on the anodic workpiece.

By the same theory the crater depth produced by a spark depends primarily upon the spark current. The time duration of the spark discharge, on the other hand, would seem most effective in increasing the crater area, presumably since the spark terminus on the workpiece may change somewhat due to the changing contour of the workpiece as the spark action proceeds.

Laboratory tests made with carefully controlled, very short discharges of given voltage, yield the following empirical relation which is in accord with the electric field force theory:

$$V = K_v T \cdot I^{3/2}$$

where V is the volume of a particle crater, $K_v$ is a constant including the inverse of the tensile strength of the workpiece, T is the time duration of the current, and I the current. Correspondingly for the depth D of the crater:

$$D = K_d T^{1/3} \cdot I^{1/2}$$

where $K_d$ is a constant corresponding to $K_v$.

Applying these relationships to spark cutting apparatus it is seen that for a given spark duration, the current amplitude determines the amount of material dislodged per spark, and that for a given amount of energy (product of current and duration) effectiveness is increased by increasing the current to time ratio.

The values involved in actual machining practice, as for tungsten carbide, for example, approach those predicted and confirm the analysis. Microscopic examination of the craters left upon particle dislodgment reveals evidence of fracture by mechanical forces. The crater left by a single spark appears to be formed by the progressive removal of several particles or the progressive crumbling of the workpiece material. In accordance with the theory, the softness of a brass cathode electrode compared to a workpiece anode such as tungsten carbide does not affect the spark machining since it depends upon the electrical energy of the spark discharges and no physical contact whatsoever is made by the electrode with the workpiece. The total material removal is, of course, the cumulative effect of a number of discharges and hence the repetition rate is directly involved in actual practice.

Recognizing then that the increase in energy per spark is important, this energy is not most effectively utilized simply by increasing the applied voltage per impulse. Instead, I have found that the correlation of the applied voltage and the time duration of the applied voltage to the minimum gap width required for a spark discharge through the liquid dielectric is explained by a theory having significant consequences which can be utilized in the method and apparatus for spark machining.

In this respect it should first be noted that after overvoltage initiated breakdown of the liquid inundated spark gap, the spark voltage across the gap drops to a stable value in the neighborhood of 30 volts, even though the voltage initially applied is of much greater magnitude. This breakdown voltage, often termed the ionization voltage, reflects the complex conduction mechanism during the discharge through the liquid dielectric following sparkover.

Significantly, however, the initial voltage applied to the spark gap and the time duration of its application are very much related to the spark gap spacing. First, the voltage required to produce a spark increases with the spark gap spacing. Second, there is a phenomenon, or group of related phenomena, best explained in terms consistent with present knowledge as the delay time of the discharge covering the period from the instant of application of the voltage to the gap (the beginning of a timed pulse) to the time the voltage reaches the stable spark or ionization voltage mentioned above. This delay period may be further divided into the initial statistical time delay (so termed because it is believed dependent upon the statistical probability of the appearance of free electrons in the gap) and the formative time lag during which the voltage drops from the applied value.

Figure 4A:
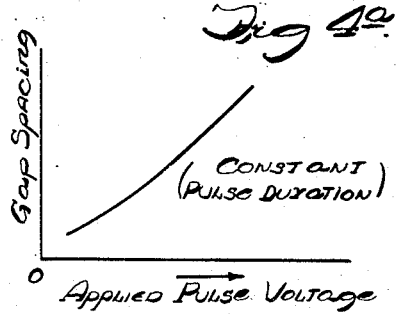
Figs. 4A and 4B are curves showing the relation of the spark gap spacing to the applied pulse voltage of a predetermined duration and the relation of the spark gap spacing to the pulse duration of a predetermined voltage.
Figure 4B:
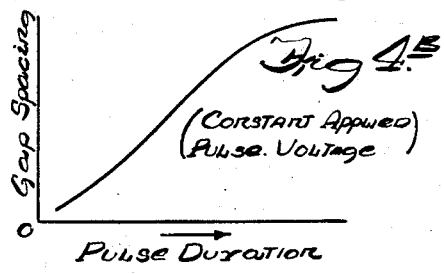

Referring to Fig. 4A, the relation of the gap spacing to the applied voltage is shown for a constant pulse duration. The gap spacing is the minimum required for sparkover during a 1.5 microsecond pulse and increases substantially linearly with applied voltage increase above the ionization voltage. Fig. 4B shows that the minimum gap spacing at which breakdown occurs increases substantially linearly with the time duration of the pulse of given applied voltage. This time factor, to the extent appreciated, is usually considered as an insignificant or indeterminate transient effect in discharge circuits generally, but such is not the case here where the transient effects are controlled and utilized.

Applying the information of the relationships indicated in Figs. 4A and 4B to the situation where the applied voltage pulse is of a predetermined magnitude and time, the average amplitude of the electrical parameters—the gap current or voltage—varies with the gap spacing.

Referring now to Figs. 5A through D, the impact of the effect of the delay time may be appreciated in the more or less idealized representations of the spark gap voltage and current variation with time. Each of the four sets of curves represents a single impulse with its current and voltage pattern portrayed (on a statistical average basis) under four different spark gap spacing conditions. The order of magnitude of the timed voltage impulse is indicated as one or a few microseconds' duration as derived from the discharge coupling network 4 and as appears across the spark gap 5. The initially applied or no-load voltage is in the order of 100 volts as compared with the approximately 30 volts breakdown or ionization voltage.

In Fig. 5A the spacing is too large to permit ionization or spark-over within the pulse period. The voltage immediately rises to its full no-load value and is maintained at that value for the duration of the metered impulse time duration.

In Fig. 5B the spark gap is decreased to a point where the delay time is only so large as to result in sparking near the end of the pulse. The no-load voltage is then reduced to the voltage required to maintain ionization across the spark gap. With the dielectric liquid previously described comprising a substantially unlimited ion source, this voltage is very nearly constant, varying very little with the spark gap length. Only during the latter period of pulse in Fig. 5B does current flow, the current curve being indicated in dotted outline as opposed to the solid outline of the voltage curve. This condition represents inefficient operation since the spark current duration is relatively small.

The desired operation is achieved with a smaller gap as indicated in Fig. 5C which shows voltage breakdown and initiation of the spark current in the initial portion of the voltage impulse. While some delay in indicating the spark gap spacing may be considered essentially correct since breakdown is assured and the current duration is for most of the voltage pulse duration, the average voltage over the entire pulse period is lower than in the examples of Figs. 5A and 5B, and the average current is higher. Such a breakdown may for practical purposes be considered as subject to minimum delay and to occur substantially instantaneously after application of the pulse voltage. With the gap spacing decreased slightly further to short circuit conditions as shown in Fig. 5D, the voltage becomes zero or near zero for the full duration of the voltage pulse. With the spark gap resistance eliminated the spark current rises at a rate subject to the amount of inductance to a high value. The substantially zero voltage and the abnormally high current are readily distinguished from the average values for a gap spacing just large enough to avoid short circuit. In practice, short circuiting is dangerous both with respect to the possibility of overloading the spark machining apparatus and also burning the surface of the workpiece being machined. It also represents inefficient operation, just as does the open circuit condition where no spark occurs, and if all of the impulses are thus wasted, the apparatus is completely inoperative.

The mechanical spacing of the gap electrodes is thus seen to control the effectiveness of utilization of each energy pulse. While the applied voltage may be increased to further reduce the delay time effect, the utilization of the pulse energy must be at the low ionization voltage level with the result that efficiency decreases as the voltage increases. Since the gap spacing changes incrementally as each spark removes anode material, it must in any event be regulated as sparking proceeds. By utilizing the time-averaged current or voltage at the gap as a measure of the gap spacing for controlling the spacing, the uniformity of spark duration and hence of spark energy is simultaneously achieved. In this way, timed impulses of given voltage provide both greater uniformity and efficiency, and speed of spark machining.

DESCRIPTION OF THE PREFERRED EMBODIMENT

Referring now to Fig. 6, the circuit diagram of a preferred embodiment of the circuit more generally shown in Fig. 1 has portions of the circuit numbered 1 to 6 inclusively to correspond to the block diagram of Fig. 1.

The source 1

The electrical energy source 1 is in this instance a power supply which produces a rectified direct current from an alternating current source which may suitably be a three-phase, 60-cycle 440 volt supply commonly available in industrial plants and indicated by the terminals 7. A power transformer 8 having a delta-connected three-phase primary winding 9 and a Y-connected three-phase secondary winding 10 may be suitably employed to step up the voltage. Full wave rectification of the secondary voltage is preferably provided, although half-wave rectification may be employed. A first set of three rectifiers 11, which may suitably be mercury-vapor discharge diodes, are connected with their cathodes in common to form a positive terminal and the anode of each is respectively connected to the end of a corresponding one of the transformer secondary windings. A similar set of three rectifiers 12 is provided with the anodes connected in common as the negative rectifier terminal and with the cathodes connected to the respective ends of the secondary windings. It is to be understood that while the cathodes of the particular discharge devices here employed and of subsequent discharge devices mentioned hereinafter may be of the filamentary type and hence require the use of filament transformers, such conventional details have been omitted from the drawing in the interest of clarity.

To satisfactorily filter the rectifier output, a relatively simple filter section may be employed comprising an inductive choke 13 connected in the positive line with a filter capacitor 14, and connected across the positive and negative buses of the rectifier and after the choke 13. Accordingly, a rectified and filtered charging voltage is provided between the positive terminal 15 and the negative terminal 16, it being understood that the power supply unit may vary widely to meet particular requirements. As of interest in this particular embodiment and indicating the relative size of the components involved, the supply is rated at 13.5 kilowatts, being designed to deliver 4500 direct current volts at three amperes continuous rating. It should also be understood that the rectification and filtering requirements are not critical except that since the charging time allotted to the energy storage means is small compared to the period of the 60-cycle supply, the amount of charge received should not vary substantially with the portion of supply frequency cycle during which charging occurs.

The charging network 2

The charging network 2 is suitably provided by charging impedances in series in the positive line, the negative line suitably remaining at ground potential. Multiple line units are provided since multiple storage means are employed in the timed pulse forming system 3, and each such unit comprises an inductance-rectifier series combination. The inductance is suitably an iron-core inductor coil or choke 17 having one terminal connected to the common positive terminal 15 and the other to the anode of one of the rectifier diode charging devices 18. The rectifier cathodes are respectively connected to terminals 19, 20, 21 and 22. The function of the impedance of the charging network is later described in connection with the pulse system 3, the inductive reactance rather than any inherent or added resistance being particularly relied upon. The rectifiers 18, it should be noted, permit current flow in the polarity or forward direction and function to block reverse currents due to surge voltages.

The timed pulse forming system 3

The pulse forming system 3 which is charged by the network 2 from the power source 1 comprises a plural pulse-forming network, each network basically comprising a capacitor 23 in series with an inductor 24, together with a rotary spark gap discharge control or switch means 25 for initiating each pulse and connected so that the plural networks can be continuously connected for charging and sequentially discharged.

Referring to the plural pulse forming networks, four capacitors 23 are suitably employed as separate energy storage means in the positive line, each connected between one of the terminals 19, 20, 21 and 22 and a common terminal. These capacitors are selected to separately store a substantial energy charge at the charge voltage which is approximately twice that of the power source 1 as is explained in a later paragraph. The insulation requirements of each capacitor are high and, to avoid breakdown or aggravated cooling problems, the capacitors should be selected for a sufficiently high frequency rating. In this respect, it should be borne in mind that the frequency is not the relatively low frequency of the pulse repetition rate but corresponds to a frequency for which the pulse length is near one-half cycle. The number of capacitors may be greater or less than shown and, should expediency or economic considerations so dictate, each of the capacitors 23 may in fact comprise several smaller rated capacitors in parallel.

The common inductor 24 with which the several capacitors 23 are connected in series is in fact the primary winding of a pulse transformer as pointed out hereinafter. Significantly, it is an iron-core inductor which is saturable within the contemplated operating range.

Each of the capacitors 23 is connected in circuit between the positive and negative power supply terminals 15 and 16 through the inductor 24 so that the several capacitors are continuously connected to the power source 1 through the charging network 2.

In order to discharge the capacitors 23 sequentially, the switch 25 is employed to selectively connect the terminals 19, 20, 21 and 22 directly to the ground or negative terminal 16, thus shunting or short circuiting the charging network 2 with respect to the discharge circuit of the pulse network selected.

This switch, beacuse of its particularly severe duty requirements involving high voltages, very short circuit-making periods, and high repetition rate is preferably a rotary spark gap having a rotary electrode 26 at ground or negative potential and four stator electrodes 19S, 20S, 21S and 22S connected respectively to terminals 19, 20, 21 and 22. A motor 27 drives the rotor at a fixed predetermined speed, although, of course, the motor speed may be made adjustable by any well known means so that the discharge repetition rate can be adjustably controlled for a particular requirement.

Due to the high switching rate and to avoid the rotor electrode wear which a construction corresponding physically to that schematically shown in Fig. 6 would entail, reference is made to the particular switch embodiment shown in Fig. 7. There a vertically mounted insulating panel 28 suitably made of hard rubber or the like bears in circular array four terminal posts 29 each clamping an inwardly directed conductive bronze rod or pin as one of the spark gap stator electrodes 19S—22S.

The spark gap rotor 26 comprises a conductive ring 30 suitably made of aluminum, having in this case twelve electrode pins 31 fixed in equally spaced relation upon its periphery and extending radially outward. This aluminum ring is shrunk on a center disk 32 preferably made of an insulating material which is mounted on a motor shaft. A conductive grounding shoe 33 is also mounted upon a panel and closely spaced to the aluminum ring to define a series spark gap. The rotor and stator pins do not make physical contact, but are arranged so as to be very closely spaced during that small angular rotation of the rotor when the pin of the rotor passes the stationary pin. Preferably, the rotor pins extend radially beyond and in front of the radially inwardly extending ends of the stator pins with a clearance distance between them. Thus any erosion occurs on the larger facing pin sides rather than on the very ends of the pins. As a rotating pin passes a stationary pin, an ionized path is formed between the pins. In the particular spark gap shown, the four stator pins are spaced at intervals of 82.5° around the rotor axis of rotation instead of 90° (thus leaving 22.5° more than 90° between the last and first pins of the stator). This spacing permits sequential operation of the four spark gaps since for every 30° rotation of the 12-pin rotor, one rotor pin is advanced to a spark-over spacing with respect to one of the stator pins. Each rotor pin sparks over four times per revolution, or once with each of the four stator pins.

With reference to the specific embodiment disclosed, the motor 27 employed drives a fifteen inch diameter rotor at very nearly 3600 R. P. M. The number of closing and opening cycles per minute is equal to the product of the number of stator pins times the number of rotor pins times the motor speed. Taking the motor speed to be its rated value of 3600 R. P. M. or 60 R. P. S., it may be seen that 2880 discharges per second are provided, each bank of the pulse forming networks being fired 720 times per second. For all practical purposes in utilization of the discharge impulses, they may be considered as uniformly time spaced.

It is obvious that without departing from the spirit of my invention, other sequential switching arrangements may be employed, although I have found the rotary spark gap particularly effective for a duty cycle of the type just described. It is also apparent that the switch can be readily modified to accommodate any practical feasible number of pulse forming networks. Likewise the number of switching operations or spark-overs per revolution may be seen to be in all cases equal to the product of the number of rotor electrodes times the number of stator electrodes providing they are spaced so as to avoid simultaneous firing. It should be noted that in the case where the larger number is not evenly divisible by the smaller or a prime thereof (i. e., where the numbers are relatively prime), each set of electrodes has its respective electrodes uniformly spaced in circular array. The rotor may, for example, have three uniformly spaced pins and the stator four uniformly spaced pins.

*The discharge coupling network 4*

Referring again to Fig. 6, the discharge coupling network 4 is the means by which the stored energy released in the pulse forming circuit is applied, substantially as a polarized, unidirectional pulse to the spark gap 5 between the workpiece W and electrode tool T.

To this end a secondary circuit including the spark machining gap 5 is inductively coupled to the pulse forming network by a pulse transformer 34 whose primary winding and core is the series inductor 24 of the primary circuit pulse forming capacitance-inductance network. The transformer secondary winding 35 is connected directly through short minimum inductance conductors 36 and 37 to the electrodes T and W. The winding is formed and its terminals connected or oriented so that the impulse generated upon the initial flow of discharge current from a capacitor 23 into the winding 24 generates a positive potential on the workpiece with respect to the tool T.

The transformer 34 as such is designed for pulse duty and significantly has a high step-down turns ratio. In practice one hundred primary turns (i. e., inductor 24) and one secondary turn have been employed. The enormous difference in impedance levels of the primary and secondary pulse circuits may be appreciated since, while the inductor may be considered to have impedance in terms of tens of ohms, the secondary impedance will be only one ten-thousandth of that value in the example described.

A further important aspect of this embodiment of my invention is that the transformer core is intended to saturate under usual discharge conditions when no machining secondary sparkover occurs. In this respect the transformer as such departs widely from the ideal of conventional transformer service. The transformer should have good coupling characteristics, however, the turns being suitably placed on an O-shaped iron tape core. While for convenienve in winding this core may be split, no substantial air gap is introduced which would prevent saturation. For safety, both windings preferably have one common ground terminal to be connected to the negative power supply terminal 16, but I have avoided use of an autotransformer since this would complete a conductive circuit of the pulse forming network 23, 24 and the power source and the machining spark gap.

Also suitably considered as part of the discharge coupling network are the primary and secondary circuit oscillatory damping means suitably respectively connected across the terminals of the inductor (primary winding) 24 and secondary winding 35.

The primary damping means is a unidirectional resistance suitably taking the form of a series resistor 38 and rectifier or diode discharge device 39. The rectifier 39 is connected to permit passage of current in the charging direction, its cathode being connected to the negative terminal 16 or ground and its anode to the positive pulse system output terminal 23a through the resistor 38. It is also polarized to block the flow of discharge current through it to the capacitors 23. To a small extent it may divide the charging current with the transformer primary winding, but its significant function is to dissipate energy from the magnetic field of the transformer and thus dampen reverse pulses or negative half cycles corresponding to reverse polarity at the secondary gap electrodes after the initial discharge pulse for which the workpiece is anodic. The added resistance is desirably low, preferably being omitted, since the oscillatory damping effect would be increased, but rectifying devices which have a high enough inverse voltage rating and which would dissipate the high forward currents involved are not presently economically available. As a matter of practical circuitry, it was found expedient to employ four parallel tubes as the diode 39, each of the tubes being a transmitting-type triode with its grid connected to its anode through a resistor and with several hundred ohms connected as the resistance 38 to dissipate the reverse impulse energy and to protect the tubes from being overloaded.

The secondary winding 35 likewise has a unidirectional resistance device 40 connected across its terminals. This device suitably takes the form of a high power germanium diode with its anode or P-terminal connected to the tool conductor 37 and its cathode or N-terminal connected to the workpiece conductor 36. The inverse impedance of the device thus blocks any appreciable current flow during the initial pulse when the secondary voltage renders the workpiece positive with respect to the tool. However, the device is connected for large current flow when the secondary voltage is opposite that desired, i. e., during negative half-cycles. Since the secondary voltage is at a much lower level than the primary voltage, no resistance in addition to the internal germanium device resistance is required to protect the device. Other diodes or rectifiers may be substituted but for effectiveness their forward resistance must be small.

The physical arrangement of the secondary circuit of the discharge coupling network in relation to the spark gap 5 is of especial importance in realizing the low inductance desired. Accordingly reference is made to Fig. 9 showing an apparatus work tank and associated components for spark gap electrodes such as those of Fig. 2. The work tank 41, preferably made of a nonmagnetic highly conductive metal such as copper, or alternatively suitably made of a magnetic material such as steel, and provided with an inner nonmagnetic conductive liner such as copper, is designed to hold the workpiece while it is being machined, the spark gap 5 being defined between the workpiece W and the electrode tool T. The gap is inundated with a fluid dielectric F such as the kerosene previously mentioned, retained in the upper portion of the work tank above a floor or bottom partition 42 in the work tank. In a lower extension 43 of the work tank below the floor 42 is the pulse transformer 34 suitably supported by an insulating frame 44. This transformer has one side of its primary winding and one side of its secondary winding connected through a common terminal 45 to ground, which in this case is the conductive work tank itself. The primary winding 35 of the transformer may be connected by a coaxial transmission line or cable 46. The grounded outer conductor of the cable is conductively secured to the side of the inductive work tank extension 43. The inner cable conductor extends through a sealingly insulated aperture and is connected to the ungrounded terminal 47 of the transformer primary winding. Inlet and outlet hose connections (not shown) are provided so that a dielectric coolant, suitably being any of various transformer oils designed for that purpose, may be circulated in the lower work tank extension 43 around the transformer 34.

A worktable or deck 48, preferably made of a nonmagnetic conductor such as copper or brass, is supported by insulating blocks 49 suitably made of hard rubber or similar insulating material anchored to the floor 42 of the work tank. The workpiece W itself is clamped in position on the conductive work deck or worktable by means of conductive dogs or clamps of a suitable size to hold the workpiece firmly on the conductive table 48. The worktable 48 itself is connected to the ungrounded terminal 51 of the secondary winding 36 of the transformer by means of a connecting cable 52 insulatingly sealed as by a porcelain bushing 53 through a central portion of the tank bottom 42 and having its upper end bolted or otherwise securely connected to the underside of the work deck 48 above the transformer. The separation of the transformer coolant and the kerosene inundating the spark gap is desirable chiefly because the insulation requirements of the transformer may not be met by the spark gap dielectric, especially in view of the fact that the decomposition products and dislodged particles suspended or entrained in the kerosene might cause flashover of the transformer. The proximity of the transformer primary and therefore of the transformer to the workpiece is significant, however, in minimizing inductance in the secondary discharge circuit. The higher order of inductance in the primary circuit does not make any inductance introduced by the coaxial cable 46 of significance and hence the primary circuit components may be spaced some convenient distance from the work tank.

The tank 41 is connected to the electrode tool T to complete the circuit from the grounded transformer secondary terminal. As further shown in Fig. 9, the tool T is clamped in a chuck 54 on a vertical spindle 55. This spindle carries just above the chuck a connecting collar 56 in conductive relation to the electrode T through the chuck and shaft. A plurality of flexible cables 57, suitably made of untwisted copper wires, are connected from the periphery of the collar to spaced points about the top edge or rim of the tank 41. Enough slack is provided in the cables to permit the electrode tool T to be raised clear of the workpiece W.

In effect the conductive work tank together with the flexible straps serves as a hollow outer conductor (corresponding to conductor 37 of Fig. 6) surrounding and connected to the ends of an inner conductor (corresponding in part to the conductor 36 of Fig. 6 and the transformer secondary winding) including the spark gap 5. The approximately coaxial low effective inductance secondary discharge circuit is more fully disclosed in my copending application Serial No. 418,408 filed March 24, 1954, and assigned to the assignee of the present invention.

*The mechanical unit*

Before proceeding to the description of the spark gap spacing control 6 of Fig. 6, reference is briefly made to the mechanical unit which it controls and with which the circuit thus far described is suitably employed. An over-all view is shown in Fig. 10 of an "inside" spark cutting machine, resembling in this case a vertical drill press in appearance. In this apparatus, a machine base 60 has a column structure 61 which supports a pair of vertically disposed and horizontally spaced bars or ways 62. A power drive unit comprising an electric motor 63 with a train of precision gearing is mounted on top of the column to rotate a lead screw 64 positioned between the vertical ways 62. The head 65 is slidably carried on the two vertical bars or ways 62 and in threaded engagement with the lead screw 64. The head is thus raised or lowered at a velocity corresponding to the direction of angular velocity of the motor 63. A hand wheel 66 superimposes manual control for raising or lowering the head. Depending from the head 65 is the spindle or shaft 55 which, as described in connection with Fig. 9, carries the chuck 54 in which the electrode tool T is clamped. A spindle guide system 67 may be suitably employed to assure accurate control of the spindle movement. A hand wheel 68 controls the front-to-back adjustment of the upper portion of the machine carrying the spindle and head.

For versatility, the machine column 61 may suitably incorporate lower vertical ways on which the work tank assembly 69 is carried. This work tank assembly suitably corresponds to that shown in Fig. 9 and contains the workpiece W and the pulse transformer 34. Hand wheel 70 provides the manual adjustment for raising or lowering the work tank assembly. A cross slide for moving the work tank transversely is controlled by the lowest hand wheel 71. While the apparatus is utilized for automatic vertical feed of only the head 65, the other slide movements of this or other mechanical units are also susceptible to automatic control to meet the requirements of particular types of spark machining.

Various auxiliary apparatus is employed in connection with the machine tool structure including a dielectric fluid sump 72 in which the fluid is stored during periods when the work tank is empty for setting up or removing the workpiece. Included are a pump and filter (not shown) for circulating the fluid in the gap and removing the machine particles and other foreign matter.

Also shown in Fig. 10 to the left of the machine tool assembly is a console or cabinet 73 within which most of the electrical apparatus of Fig. 6 is mounted. As indicated in the drawing, this console may be divided into cubicles and provided with interlocked doors. A window in one of the doors reveals the rotary spark gap switch 25 of the timed pulse forming system so that it may be observed during operation. The cubicles also contain the power supply components, the pulse forming networks, and the damping rectifier diodes, together with most of the servo-mechanism control elements associated with the automatic gap control means 6. It may be further noted that the blower 74 mounted on the side of the console provides cooling air to the damping diodes since the heat dissipation requirements of the system are very large. The push-button control panel 75 for operating the system is incorporated on the machine tool to the left-hand side of its column as also shown in Fig. 10.

It is to be appreciated that while the electrical system of spark machining apparatus incorporating my invention may be employed for various types of spark machining operations, the machine tool apparatus itself requires careful selection if the precision and versatility inherently present in spark machining systems is to be realized. Industrial quality precision equipment is also particularly desired for automatic operation, since even though the reaction of the workpiece upon the electrode tool is negligible, very close tolerances are involved in progressively feeding the electrode tool to maintain the desired optimum spark gap spacing as the machining progresses by dislodgment of particles due to the spark action.

*The gap spacing control system*

Referring now to the spark gap positioning control 6 shown in Fig. 6, the system may be seen to comprise an automatic follow-up system or servo-mechanism which in response to an error signal derived from the time-averaged voltage of the successive voltage pulses applied to the spark gap 5 controls the speed and direction of the motor 63. The motor in turn controls the electrode tool position to eliminate the error signal.

Referring first to signal-deriving input network of the servo-mechanism, it should be first noted that the voltage signal pick-up leads 76 and 77 are connected respectively to the workpiece W and electrode tool T sides of the spark gap 5. Preferably, the connection of the pick-up leads is as close as practical to the spark gap itself rather than for example across the transformer secondary terminals since even the small amount of inductance in the discharge circuit conductors is sufficient to prevent a true gap voltage reading under discharge conditions. The positive lead 76 is connected through a rectifier diode 78 and thence to ground through a first series resistance-capacitance circuit comprising a resistor 79 and capacitor 80. The negative lead 77 is connected directly to ground potential. The diode 78 is polarized to permit the positive pulses to pass but eliminate any reverse oscillatory impulses.

In the first resistance-capacitance combination 79, 80, of the signal network, the time for charging the capacitor is made short enough so that the potential on the capacitor is increased during the pulse period to a value approximating the average value of the voltage pulse. The charging time should therefore be (1) greater than the pulse length (lest the capacitor voltage merely indicate the initial applied pulse voltage rather than the average individual pulse voltage) and (2) less than the period between the pulses (or else the stored voltage per pulse would be so small as to hardly reflect the differences in the average voltage of different pulses). Since the time constant as the product of the resistance capacitance represents the major and significant portion of the charging time, these specifications of charging time may be directly translated to those of the charging time constant. In practice, with the period between pulses several hundred times the pulse length, the charging time constant is itself many times the pulse length.

A second resistance-capacitance network includes the same capacitor 80 and governs the time constant for discharging the capacitor. The resistance thereof includes the sum of the resistance of resistors 81 and 82, and the part of the zero-setting resistor 83 connected in series across the capacitor 80. This resistance is very much higher than that of resistor 79 so that the discharge time constant equals the time duration of many pulse-to-pulse periods. A signal derived from the capacitor 80 will thus vary slowly enough due to the high discharge resistance so that its average value can be approximately followed by the tool feed motor 63. Thus after a series of pulses in which the average gap voltage (as discussed in connection with Figs. 5A to 5D) changes due to the change in time duration of the spark conduction, the trend is apparent in the capacitor voltage and a useful signal produced.

As may be seen by reference to Fig. 6, the resistor 81 is connected to the positive terminal of the capacitor 80 and the resistor 82 connected in series with it to a tap on the zero-set resistor 83. This resistor 83 is connected between ground (or the capacitor negative terminal) and a negative voltage source B—. The voltage across the resistor 82 may thus have particular positive or negative amplitude with respect to ground depending upon the averaged gap voltage signal. A separate signal output gain-control resistor 84, connected between ground and the common connection of resistors 81 and 82 provides the useful signal range. Resistor 84 also has a sufficiently high resistance so that as part of the over-all discharge network resistance it is high enough not to materially shorten the long discharge time constant previously mentioned. An adjustable tap on the resistor 84 controls the gain.

In referring to the first and second resistance capacitance networks some simplifying assumptions have been made, namely, that other resistance path besides those named do not appreciably affect the operation or predictability of the circuit. As one skilled in the art would recognize, the diode 78 also has resistance which may be considered with that of resistor 79. The resistance of the discharge network also affects the charging of the capacitor 80 but has only a small effect. The resistance of the second network also includes the shunt resistance of resistor 84 and the amplifier load, but these are high enough to not substantially affect the time constant analysis and design in terms of resistors 81, 82 and 83.

The signal voltage is suitably conveniently amplified to drive the feed motor. For convenience and clarity I have indicated by a block diagram 85 a vacuum tube amplifier which may have, for example, a direct current amplifier stage followed by a push-pull or paraphase output stage.

The electronically amplified signal may be employed to control directly the speed and direction of rotation of a small motor if the mechanical load permits. When the load is larger further power gain may be obtained by employing the output of the amplifier to excite the field winding 87 of a direct current generator 86 suitably driven by a constant speed motor 88 as indicated in Fig. 6. The output voltage of the generator is connected to the armature of the direct current motor 63 which controls the speed and direction of the electrode tool movement. Preferably the generator is an armature-reaction excited machine having a primary armature circuit carrying the excitation armature current which circuit is completed by short-circuiting the armature primary brushes. The output voltage appears across the brushes of the armature secondary circuit, a greater degree of amplification of the field signals and range being thus obtained.

Also coupled to the shaft of the motor 63 is a tachometer generator 89 which furnishes a velocity-responsive feed-back signal to the amplifier 85. The feed-back control circuit is employed for velocity or proportional control so that when the amplifier output signal calls for a reversal of the drive motor, a positive feed-back occurs until the motor has slowed down to zero speed and a negative feed-back is available as the motor rises in speed in the opposite direction. This way, a higher follow-up speed is obtained without introducing additional hunting or over-shooting problems.

*Particular modifications*

In the description of the mechanism for automatically controlling the gap by measurement of the effect of the gap width upon the average value over the pulse period of one of the pulse electrical parameters, the pulse voltage was utilized. As shown in Fig. 11, an induction means may also be employed to derive a signal corresponding in amplitude to the average amplitude of the average spark current. As explained in connection with Figs. 5A–5D, in pulses where sparking occurs, this average value will be directly dependent upon the current duration, which in turn varies with the spacing. The induction means suitably takes the form of a toroidal core transformer 100, the core 101 of magnetic material surrounding the conductor of the spark discharge circuit, which conductor may suitably be the electrode tool T itself. The tool T thus serves as a one-turn primary winding, thus adding a minimum of inductance to the discharge circuit. A secondary winding 102, which may be suitably several hundred turns of small enameled wire wound around the toroidal core, has its leads coupled, preferably through a coaxial cable 103, to the servo-amplifier chassis such as that employed with the gap control means shown in Fig. 6.

An alternative arrangement of the timed pulse forming system for greater versatility of operation is also shown in Fig. 12. As shown therein, the input terminals 19—22 from the charging network 2 are not directly connected to the energy storage means, but instead each is attached respectively to the center electrode of a corresponding switch element of a double throw selector switch 104, which may suitably be manually controlled. The four switch elements of the switch 104 are designed to be operated in unison to connect each charging network to one of the alternative pulse forming networks.

With the switch 104 at its upper position, each of the charging terminals is connected to one of four capacitors 105 which in turn are connected together at the common terminal of the inductor 24 which is the primary winding of the pulse transformer 34.

With the switch at its lower position, pulse forming network elements 106, 107, and 108 are inserted in circuit in place of the simple capacitors 105. Each of the networks is, in series connection, a series capacitor 106, a series inductor 107, and two series connected inductor-capacitor parallel circuits 108, together with the series inductor 24. The series capacitor 106 is the energy storage means across which the full charging voltage appears. The discharge pulse is more or less squared so that the pulse has a steep front and a maintained high energy level. For the pulse squaring function the parallel circuits, here shown as separately included in each of the multiple networks, are tuned to even harmonics of the fundamental series resonant frequency represented by the series inductance of windings 107 and 24 and the series capacitance of capacitor 106.

It is to be understood that various other forms of energy storing passive pulse forming networks may be employed for charging from a direct current source, or that the Gillemin lines described may be modified using other numbers of harmonic parallel circuits 108 depending upon the pulse squareness sought. The separate series inductors 107 may also be consolidated with the common inductance of the transformer primary winding 24 or omitted, depending upon the convenience and cost involved. Thus, if certain standard size capacitors are employed, the inductance required to be added to the transformer primary inductance is most easily supplied by such separate units 107. The advantages of inductively coupling directly into the pulse forming network by means of the secondary winding 35 are retained.

Thus by use of alternative pulse forming networks, the apparatus may be conveniently adapted for providing a rough cut such as by making each of the capacitors 105 of a larger value than the alternative capacitor 106. The larger quantum of energy stored and discharged by each capacitor results in a larger amount of material removed per spark in a first roughing operation and the lesser but more finely controlled amount of energy discharged by the pulse forming networks produces a finer finish in a second finish cut. Obviously, various combinations of capacitive energy storage means may be thus employed, it being desirable, of course, to maintain sucessive discharges of equal energy for any one given cutting operation. The selector switch 104 is suitably positioned within the cabinet 73 and not designed to be operated while the circuits are energized.

Also shown in connection with the modified circuit of Fig. 12, is a shorting safety switch 109 which is designed to be interlocked with the doors of the equipment cabinet. While the interlock mechanism details are not shown, it will be understood that upon opening of the cabinet doors, such as for operating the selector switch 104, the contacts of the safety switch are closed to short circuit and ground any residual charge of each of the capacitive energy storage means 105 or 106. Possible electrical shock injury to the machine attendant is thus avoided. The safety switch 109 may suitably take the form of a five-pole single throw switch having a plurality of contacts connected to each other and to ground through closing of the switch, the contacts being connected to the respective terminals 19–22 and the common terminal of the capacitors.

OPERATION OF THE PREFERRED EMBODIMENT APPARATUS

The method of operation of the spark machining apparatus of the preferred embodiment described in the preceding paragraphs, while indicated in explaining the functional identity of the various components, is further set forth in the following paragraphs. A further appreciation of the range of equivalents and alternative embodiments may also be gained thereby, together with a further explanation of the manner in which the various advantages are realized.

Before beginning the spark machining operation, the workpiece to be machined is carefully positioned and the work tank alined as desired with the electrode tool. The work tank is preferably drained of the kerosene or other dielectric fluid employed during the set-up period and then filled again to a level so that the workpiece, or at least the portions of it which define the spark gap with relation to the electrode tool are inundated. The apparatus is never operated without the dielectric liquid in the gap since the machining action would be ineffective or deleterious to the machine and work.

With the inside machining or drill press type of apparatus disclosed a spark cutting electrical circuit as shown in Fig. 6 is energized after the set-up has been completed and the electrode tool is manually lowered toward the workpiece until the spark gap spacing servocontrol mechanism takes over and the automatic operation begins. The safety of the machine attendant is assured since the operation is automatic and the only unshielded part of the circuit is the workpiece which is inaccessible insofar as it is submerged in the kerosene in the grounded worktank.

Upon energizing of the electrical circuits the electrical energy source 1 functions conventionally as a full wave rectifier to produce a direct current voltage at the output terminals 15 and 16. Through the charging networks 2 the capacitors 23 of the pulse forming networks of the timed pulse forming system 3 are in effect placed on continuous charge. While there is some inherent resistance inevitably present, no added resistor need be employed, and an initial time delay in the recharging of each storage means 23 more significant than caused by resistance is introduced by the self inductance of the corresponding charging choke 17. The charging rate increases thereafter but does not decrease to zero when the voltage charge equals the voltage of the source 1 but instead the same charging choke 17 tends to prevent that current change by discharging its stored energy. The cumulative voltage of both the source and the stored charge is almost twice the source voltage. During this time the charging current has been flowing through a series connected rectifier diode 18, it having a negligibly small voltage drop between its anode and cathode as compared to the 4500 volt rating of the power supply, but upon the tendency of the current flow to reverse after discharge of the charging choke, is blocked by rectifier 18. In this way the tendency of the charging circuit to oscillate is checked while at the same time a doubled voltage charge of approximately 9000 volts is obtained by such resonant charging. Considering the capacitance C of each pulse forming network 23 and the voltage charge E, it may be seen that since the stored energy is $\frac{1}{2}CE^2$, the energy stored is thus quadrupled through the action of the charging network.

With the rotary spark gap switch 25 of Figs. 7 and 8 operating at its rated speed the pulse forming network input terminals 19, 20, 21 and 22 are successively momentarily connected to the grounded negative terminal connection 16 through the associated switch stator contact 19S, 20S, 21S, or 22S and the switch rotor. This multiple spark gap, employed as a switch for instantaneous make and break at high voltages, offers a significant contrast with the spark gap of the spark machining process. The stationary spark gap pins which comprise the stator contacts are adjusted so that the rotor pins 31 pass preferably with a clearance somewhat under .01 inch along a partial overlap of the radial rotor and stator pins. The sparking is distributed between different combinations of the rotor and stator pins. The metal collecting or grounding shoe is held sufficiently close to the metal ring 31 of the rotor so that the cumulative spark gap at both the pins and the shoe is less than .02 inch for stable operation. The duration of the switching spark, which is the effectively closed circuit period of the spark gap switch, corresponds to the time required to discharge a capacitor 23 which time is very short and in this case in the vicinity of a few microseconds. The switching spark is essentially a matter of conduction through a gas, whether air or a rarified atmosphere should the switch be located in a vacuum enclosure. The handling of the same level of energy by the spark gap switch as by the spark machining gap with only a customary minor destructive spark erosion of the switch contacts as compared to the rapid spark cutting of the workpiece, illustrates the significance of the controlled conditions of the spark machining process where higher currents, carefully maintained spacing, and the dielectric liquid are required.

At the times the various pulse forming network input terminals 19—22 are effectively grounded to the negative terminal 16 through the spark gap switch, the output terminals of the charging network 2 are also effectively short-circuited. Current from the power supply then returns directly through the charging network 2. Damaging short-circuit currents and undue rotary switch electrode erosion are prevented by the charging choke 17 since upon operation of the spark gap switch the choke reactance prevents or delays a rapid initial increase in short-circuit current from the power supply 1. This current initially increases relatively slowly and is still at a relatively low value when the switching spark gap electrodes are displaced to terminate the spark. Discharge of such charge as is then accumulated on the other three capacitors 23 through the closed switch circuit of the fourth is also avoided by reason of the intervening sections of the charging network 2.

A particularly significant aspect of the operation is provided by reason of the plurality of capacitive storage means which are sequentially discharged at a regulated rate by the switch. The charging time of each is, of course, much longer than the pulse discharge period, suitably being in the vicinity of 50 times as long in one apparatus built and operated in accordance with my invention. The power supply 1 requirements and the charging impedance (in this case, the inductance of the charging chokes 17) are accordingly governed. The maximum spark repetition rate is that permitting each capacitor 23 to receive its full charge before being fired again. The use of a plurality of capacitors permits increase of the repetition rate since the charging periods of the capacitors overlap. In practice the charging time set by selection of the charging circuit component values has been appreciably less than the repetition period for any one capacitor although more than the time between sequential discharges. While the charging of any one capacitor may thus cease for a period before its discharge, the capacitors are in fact all continuously connected to the power source by the charging network. In this respect, all the capacitors are continuously or simultaneously charged, although necessarily starting their charging periods in time sequence during operation. No opening of the charging circuit is required. The number of capacitors 23 and hence the number of pulse forming networks may be increased as desired to either reduce the power rating required of each capacitor or to increase the repetition rate. Likewise the number may also be decreased from the four shown.

Considering now the charging and discharging function of the timed pulse forming system 3 apart from the operating requirements of the power source 1 and charging network 2, the pulse forming networks are charged as simple capacitors in one direction through the common inductor 24. The charging rate of the capacitors 23 is relatively low and the passage of composite charging current for the several capacitors through the inductor 24 does not cause any appreciable reactive voltage. This condition prevails during the relatively long intervals between the short closed periods of the switch 25.

When a rotary spark gap switch contact is closed (i. e., when a rotor pin passes one of the four stator pins), the positive terminal of the capacitor involved is effectively grounded so that the charged capacitor discharges into the inductor 24 in the opposite direction from the charging current flow. Moreover, since the inductance of the inductor 24 is very much less than that of the charging network, the rate of current flow is much larger. It is during discharge of each of the capacitors that the pulse forming network performs as such. As previously mentioned, the inductor 24 cooperates separately and sequentially with each of the capacitors 23 to form in sequence, a plurality of simple LC circuits. The energy stored in the capacitor 23 is transferred into the inductor 24 in the first half cycle period corresponding to the frequency of the circuit completed by closing the rotary switch. Because of the variation of the resistive loading as well as the variation of the inductance itself, as explained, the analysis is much more complex than the case of a simple parallel resonant circuit. However, the inductance of the primary winding is significant in the pulse forming function as distinguished from the case of simply discharging the capacitor into a conventional load impedance. Each discharge tends to produce an oscillatory train to be attenuated rapidly after the first half cycle or positive pulse.

Referring now to the transformer action, it may be seen that the particular mode of operation is obtained by coupling the machining spark gap load directly into each pulse forming network by employing the inductance 24 of the pulse forming network (or at least a portion of that inductance as shown in Fig. 12) as the primary winding of the load coupling transformer 34. Due to the rapid rate of voltage change across the inductor 24 during discharge, a first half cycle impulse is induced in the secondary circuit in which the workpiece is placed at a positive potential with respect to the electrode tool.

The transformer iron requirements for the desired pulse duty are simplified in view of the reversal of current flow through the winding during the initial discharge. During capacitor charging, the transformer core is biased in one direction, that is, flux due to the charging current ampere turns is produced. The flux direction is reversed by the discharge ampere turns so that the flux change is over a wider range saturation of the core material.

Because of the inductive coupling, the spark machining gap circuit is conductively separated from the pulse forming network as well as the power source and charging network. Direct current isolation of the primary and secondary circuits is thus maintained, notwithstanding the common ground connection of the transformer primary and secondary windings.

Due to its step-down turns ratio, the transformer action also operates to provide a more efficient transfer of stored energy from the primary circuit where a high voltage is desired for maximum capacitive energy storage to the secondary circuit where high currents are sought for increased material removal rate. In view of the relatively low voltage maintained across the gap upon sparkover and the following discharge, a high voltage secondary circuit would be wasteful of the pulse energy. The operational problem overcome by the transformer is likewise not one simply of impedance matching since the ionized gap does not have a fixed impedance and an appreciable overvoltage is required for initiating the sparkover within the pulse period. I have found a pulse supply at a no-load voltage in the vicinity of 100 volts to be adequate for rupture of the dielectric in machining gaps small enough to help generate machined contours substantially complementary to the tool and large enough to facilitate removal of the dislodged chips.

Damping of the negative half cycles and thus the attenuation of the oscillatory train following the main pulse occurs in both the primary and secondary circuits. Thus in the secondary circuit with the germanium diode 40 preferably connected directly across the secondary winding terminals and polarized to permit easy current flow during the negative half cycle following the initial pulse, I have found the dissipation of the energy of the negative half cycles to be most effectively accomplished. Erosion of the electrode tool due to its being rendered positive during undesired oscillation following the pulse comprising the first positive half cycle is thus reduced.

Also operating to dampen the undesired negative half cycles is the primary circuit damping means comprising the diode 39 with the usually required accompanying protective series resistor 38 in shunt with the primary winding or inductor 24. The diode does not pass any appreciable current in the discharge current direction from any one of the capacitors 23 to ground, but upon the tendency of the inductor voltage to reverse, energy is dissipated by current flow through the directional impedance.

It may be noted that while the diode 39 is polarized for conduction of the charging current flow therethrough, the shunt current so directed is usually small due to the much lower impedance presented to the charging current flow by the inductor 24 and enough voltage drop across the inductor 24 is readily maintained during charging for negatively biasing the transformer core.

Due to the unique operational requirements for the apparatus in view of the nature of the load and the manner in which it is coupled to the pulse forming network, more than the discharge of a simple capacitance-inductance circuit and unidirectional damping of negative half-cycles is involved. First, the normal load provided by the machining spark gap is a substantially open circuit condition during the formation time required for a spark discharge followed by an essentially constant voltage discharge at a voltage level substantially lower than that initially applied. As previously mentioned, despite refinements of the gap spacing control, the spark machining gap is susceptible also to short circuiting by insufficiently prompt or complete removal of dislodged particles and likewise the spark gap may be too large such as during the period following back-off of the tool electrode after a short circuit. Thus conditions ranging from open circuit to short circuit must be encountered, and while the incidence of the extreme conditions may be so small as to not seriously affect the machining rate, they represent a danger to the equipment itself, particularly the rotary spark gap in the primary circuit.

During normal operation upon closing of the primary spark gap switch, a capacitor 23 begins to discharge through the inductor or primary winding 24. A secondary voltage is induced and, after the short delay time required for gap ionization, a substantial secondary circuit load is developed. The energy in the secondary circuit is dissipated mainly in the impedance of the ionized spark path and also of the high current path in the surface volume of the workpiece being machined, this being in addition to the losses due to reverse current through the diode dissipating device 40.

It may be noted that while apparently more energy is expended in maintaining the ionized spark discharge than in actually removing material, the spark-over initiated discharge is the key to producing the particle dislodging high current densities in the workpiece. To that extent, the operation of the apparatus may be considered as directed to the dissipation of energy derived from the power source 1 in the machining spark gap.

During open circuit conditions, the current increases in the transformer primary winding following initiation of the capacitor discharge by the rotary switch. No load is reflected into the primary circuit from the secondary circuit except as may be due to distributed impedance such as the capacitance of the machining spark gap. With no sprak-over occurring after the customary delay time, the primary magnetizing ampere turns increase until the transformer core is saturated and thereafter the current flow is limited by the circuit resistance which is principally that of the primary winding itself. Accordingly, a considerable amount of heat is generated in the transformer as an $I^2R$ loss and must be removed by the transformer cooling means. When the current through the primary winding has dropped due to the decrease of the charge on the capacitor 23 and collapse of the magnetic flux in the core, the self-induced reverse voltage is damped by the unidirectional resistance means 38 and 39.

During short circuit operation the duty requirements are much more like those of the open circuit condtion than the usual normal operating condition. In such a case, the short circuited electrode and workpiece do present some load due to the contact resistance and the distributed impedance. Since analysis indicates secondary circuit energy dissipation to be less than when the spark gap is ionized, the remaining amount of the capacitor-stored energy therefore has to be dissipated in the primary circuit.

Because of the varying load conditions and due to the desired saturation of the transformer core, the pulse length also is subject to some variation in length, it being greater than normal during open-circuit conditions and shorter than normal for short circuit operation. Variation of pulse length under cutting conditions has not been observed to be particularly significant at least so far as the average pluse voltage is concerned. It will be appreciated that were it not for the desired saturation of the transformer, the open circuit pulse would tend to be much longer, with the resulting difficulty of discharging or dissipating the unused energy in the required short time.

During the course of the spark machining, the successive sparks through the kerosene or other dielectric each remove particles of the workpiece. The sparking does not persist at a given location because after each spark the workpiece contour has been slightly changed. The next spark occurs at the next likely location which is the point where the spacing between the electrode tool T and the workpiece W is least and the electrical field gradient highest. With the sparks occurring at the rate of almost three thousand per second, the spark gap, absent a tool feed means, would soon widen itself to the point where no discharge would occur upon application of a pluse of given applied voltage and time duration.

However, the operation of the average current or voltage responsive electrode feed system causes the electrode to advance toward the workpiece to follow the bore thus created and maintain the optimum spacing between the active surface of the electrode tool and the surface being eroded in the workpiece. A voltage corresponding to the average positive voltage across the gap appears across the capacitor 80, being derived through the low time constant of the diode 78 and resistor 79 in series combination with the capacitor. The incremental or discrete voltage charges corresponding to each pulse are further averaged with respect to the pulse-to-pulse period by the high time constant discharge circuit of the capacitor 80.

Since the current is a gap parameter as well as is the voltage, it may also be averaged as suggested by Fig. 11 to provide a control signal.

The zero reference for the signal, that is, the referencing of the signal to provide an error signal or reference for a voltage varying with deviation from the signal produced when the optimum spacing is provided, is adjusted by setting the tap on the negative voltage resistor 83. The gain is next adjusted on the gain-control resistor 84 and the amplified signal conventionally produced and supplied to the field 87 of the generator 86. The generator voltage will correspond in amplitude and polarity to the signal applied to its field, a zero signal indicating the desired instantaneous spark gap spacing. While the spark action itself is incremental, the bore or other machining cut does not increase by measurable increments since the sparking does not simultaneously occur over the whole face of the tool at once. The control of the electrode feed is therefore smoothly continuous rather than by steps.

Care is taken, of course, to maintain the circulation of the kerosene to convey the dislodged particles or chips away from the active spark gap surface lest they accumulate to cause complete or partial short circuiting. In the case of a short circuit produced by accumulated unremoved particles, the derived signal on the capacitor 80 drops to zero from a usual positive value and the voltage across the gain-control resistor 84 becomes negative with respect to ground so that the motor 63 quickly reverses and clears the short circuiting condition.

In adjusting the automatic gap spacing control system 6, it is not necessary to use complex instrumentation to assure full utilization of the available pulse energy. For the most part, it is entirely satisfactory to adjust the tap on the zero setting resistor 83 to a point which provides the highest velocity forward feed under open gap conditions.

The gain control 84, as is well known in servomechanism art, may be adjusted for the driven system to lag rather than to balance.

Under some conditions weher reduction of the possibility of short circuiting at the expense of machining speed is desired, the zero adjustment may be set for zero error at an averaged voltage just less than that corresponding to open voltage.

The actual feed velocity will vary when tools of different cross section area are employed because of the different amount of material to be removed per unit of feed advance. However, no readjustment of the control system is required providing the chip removal is maintained at maximum effectiveness. When different combinations of anode workpiece and cathode tool metals are involved, resetting may be desirable because of the different gap and cutting characteristics involved in most cases.

A minimum safe spark time delay, and hence the maximum utilization or dissipation of the spark energy in the gap is achieved by controlling the spark gap width as indicated by the electrical parameters themselves. Since the time duration and applied voltage are predetermined, and since the spark current is affected very little by variations in the gap width, it is the time-averaged value of the electrical parameters which is significant. This significance is peculiarly and particularly dependent upon the fact that the energy pulses are independently timed.

Figure 5:
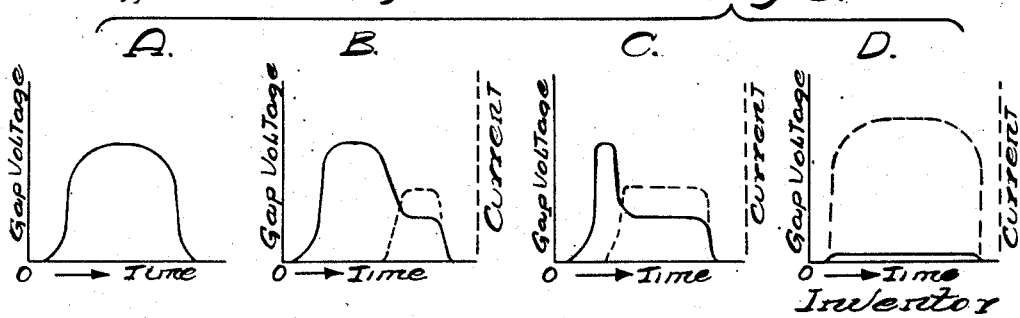

While in the described embodiment the shape, phase, and length relationships of the voltage and current pulses depart more or less from the more nearly ideal curves of Fig. 5 explained in connection with the general theory of automatic gap spacing with pulse operation, the time delay effect is believed to most satisfactorily explain the operation.

The gap spacing, however, is subject to control on a less precise basis for pulse-type spark machining circuits embodying my invention. While the designs of such other servomechanisms are not the subject of my present invention, pulse counting types of control may be utilized responsive to the percentage of short circuited pulses or of open no-load pulses as a measure of the gap spacing.

DESCRIPTION OF A SECOND EMBODIMENT

Another embodiment of my invention is illustrated in Fig. 13 in which the circuit is somewhat amplified and a single storage means employed, although it is understood a multiple sequential system may be employed. Here again the tool and workpiece are represented by the same conventions as set forth previously, it also being understood that during operation the spark gap is inundated with a dielectric liquid such as kerosene or transformer oil. A specific mechanical unit for use with the circuit is not specifically indicated, but the circuit may be employed in spark machining apparatus generally.

For convenience in understanding and describing the circuit of Fig. 13, it may be divided into component parts corresponding to the block diagram of Fig. 1. Thus the Fig. 13 has an electrical energy source 110, a charging network 111, a timed pulse forming system 112, a discharge coupling network 113, a spark gap defined between the workpiece W and the electrode tool T together with a gap spacing control system 114.

The direct current source 110 is conventionally represented as a battery, it being understood that the voltage is relatively high, being preferably in the order of hundreds or thousands of volts. This source is connected to an energy storage means through the charging network 111 comprising leads connected to its terminals and including in one lead a charging resistor. It will be appreciated that the resistance of the charging network limits the maximum current which can be drawn from the source 110 to a value which protects the source from destructive overload. The charging network may be more complex of course to include resistance or further inductive elements in one or both of the source conductors or further internal impedance in the source itself. For the purposes of describing the invention as set forth in the embodiment of Fig. 13, the single resistor of the charging network is sufficient.

In the timed pulse forming system 112 a capacitor 115 is the energy storage means and a rotary switch 116 initiates the energy pulses. The pulse forming network suitably corresponds to any one of the pulse forming networks described in connection with Fig. 12 consisting essentially of the capacitor 115 connected in series with an inductor 117 which is also the pulse transformer winding. Inductor-capacitor combinations 118 and 119 together with an additional series inductor 120 may also be employed. The constants of the network are chosen to produce a pulse of a few microseconds duration upon coupling into an appropriate load. In the charging of the storage means 115 the impedance of the charging network 111 lengthens the charging time so that the system charges more slowly than the period in which it is designed to discharge.

For initiating the pulses and timing the periods between them, the switch 116 is employed and suitably takes the form of a rotary spark gap switch in which a pair of spaced electrodes are separated only by the small double spark gap when the rotor electrodes are alined with the stator electrodes. The switch is thus effectively closed for high voltage switching circuits just as if the electrodes made physical contact, but with the advantages of spark gap switching previously described.

A motor 121 drives the rotor of the schematically illustrated spark gap switch 116 at a high constant speed, preferably in the order of thousands of revolutions per minute. The closure or spark time is very short and is for all practical instances for a single storage means much shorter than the time between pulses. The motor speed is preferably so related to the charging impedance that the switch 116 operates upon charging of the capacitor to its full value. If resonant charging is employed by using inductance in the charging circuit this synchronization may be carried further to discharge the switch at the time the capacitor is at its peak voltage above the voltage of the source 110. In such a case charging diodes need not be used to block current flow back from the capacitor into the charging inductance.

On each closure of the switch 116 an energy impulse in the primary circuit of the discharge coupling network 113 results in an induced secondary impulse. The induction means is suitably a pulse transformer 122, having its primary winding terminals connected to the terminals of the capacitive storage means 115 through the switch 116. The secondary winding is connected between the tool and workpiece of the spark gap to provide a positive pulse, i. e., with the workpiece at a positive potential with respect to the electrode tool. As discussed in connection with the first preferred embodiment, this transformer has a step-down turns ratio so that the secondary circuit has a relatively low voltage and high current as compared with the primary voltage and current.

Referring to the operation of the circuit of Fig. 13 as thus far described, it may be seen that the capacitor 115 in this case is continuously connected to the power source through charge network although not charged through the transformer primary winding. Upon closing of the spark gap switch, a discharge path is presented to the charged capacitor through the winding 117 and other elements of the pulse forming network. The power source 110 is not short-circuited because the resistance of the charging network 111 limits the source current during the brief period that the spark gap switch is closed. In the secondary circuit, the operation is as previously described, each over-voltage initiated spark discharge occurring between an essentially anodic workpiece and essentially cathodic tool.

In this instance the means for unloading the charged capacitor when the cutting spark does not occur is shown as a resistor 123 connected across the secondary conductors, suitably at the terminals of the secondary windings of the transformer 122. This resistor is advantageously non-linear in conduction characteristics, not necessarily in the sense of unidirectional conductivity as in the case of a rectifier diode, but in the further sense that its resistance decreases substantially with the increase of voltage. A material having a conductivity increasing with a power of the applied voltage and made of silicon carbide, such as "Thyrite," is advantageously employed.

Accordingly, with such a non-linear resistor 123 connected across the secondary terminals, a load is imposed at all times in the secondary circuit even when the gap spacing is too large for spark-over and effects of long period primary discharge are reduced. It will be appreciated that without the resistor and with the spark gap spacing too large to permit a spark discharge, the impedance of the primary circuit to the discharge of the storage means is very high. Viewed in other terms, the load is so very badly mismatched with respect to the capacitive storage system under such conditions that as a result the switch 116 would be subject to excessive electrode wear in view of oscillatory currents as the switch electrodes separate to open the discharge current. However, the resistor 123 serves to unload the energy, dissipating it in the resistor itself. When the spark gap is spaced for normal operation, however, the higher effective resistance across the resistor terminals due to its non-linear characteristics prevents the resistor from dissipating too large a share of the energy that might otherwise be directed to the spark gap.

Even a conventional linear resistor may be used with some success in that it will prevent excessive electrode wear of the primary circuit switch electrodes under no-discharge conditions although at the expense of dissipating a larger part of the secondary circuit energy when the tool-to-workpiece spacing is correct. In a further respect, either linear or non-linear resistance is useful in providing a predetermined transformer loading prior to spark-over and in damping the tendency to oscillate.

An automatic gap width control system 114 suitably takes the form shown in Fig. 13. As in connection with the first embodiment described, the spark gap voltage appearing across the transformer secondary conductors is applied by positive and negative leads 124 and 125 respectively to a rectifier diode in series with a resistor. As shown in this instance, the positive (workpiece) lead 124 is connected through the resistor 126 to the anode of the rectifier 127 whose cathode is connected to the negative (electrode tool) conductor 125. A capacitor 128 shunts the resistor 126 and is charged and discharged thereby. The voltage across this capacitor thus varies with the average secondary voltage in the spark-cutting circuit and is suitably amplified by a vacuum tube amplifier 129. This amplifier suitably has the capacitor 128 connected between its grid and cathode in series with a source of grid bias potential represented as a bias battery 130.

The amplifier output circuit includes, in addition, a power source shown as a battery 131. One of the field windings 132 of a dynamoelectric amplifier 133 (such as an armature-reaction excited generator of Fig. 6) is connected in the output circuit.

An opposing field winding 134 of the same amplifier generator 133 is connected in series with an adjustable resistor or rheostat 135 to shunt the amplifier power source 131.

With the armature of the generator 133 driven by any suitable motor at constant speed, as by the schematically indicated motor 136, a generator voltage is produced which varies with the net excitation of the two field windings 132 and 134. The generator output voltage is accordingly connected to the armature of a D.-C. motor 137 which motor is in turn mechanically coupled to the electrode tool T to raise or lower in accordance with the direction and speed or rotation of the motor. This drive motor 137 suitably has a constant field excitation shown as provided by a battery 138 connected to the motor field 139.

The field winding 132 of the control generator is energized by the direct current amplifier to produce a generator output voltage of a polarity which drives the feed motor in a direction to decrease the gap between the electrode tool T and the workpiece W with an increase in the average signal voltage derived from the secondary circuit. The excitation of the other winding 134 by the fixed voltage of the battery and adjusted rheostat counteracts the excitation of the first field so that if the average secondary voltage is very small, the excitation of the second field winding 134 predominates and the spacing is increased. The balance point provided by a net excitation of zero produces no generator output voltage and no motor speed. At such a point the electrode tool spacing corresponds to the desired intermediate spacing between the limit conditions. By adjusting the rheostat 135 this reference point may be adjusted to fit the needs of the particular machining operation.

METHOD AND SUMMARY OF INVENTION

From a consideration of the foregoing description, it is apparent that my invention may also be described in terms of the novel method involved in its practice. In one aspect the method may be seen basically to comprise the steps by which electrical energy is derived from a continuous power source and applied to the dielectric liquid filled spark gap defined between a conductive workpiece and an electrode tool as short, time-spaced energy pulses, the pulse voltage, its time duration, and the gap spacing being correlated for maximum utilization of the particle dislodging spark energy.

First energy is converted from a continuous power supply to a series of uniform time-spaced energy quanta by storing the energy in a capacitive storage means and discharging the energy as unidirectional pulses. Because of the difficulty of forming such short, high energy pulses as are required for spark machining, these energy quanta are preferably each discharged as a timed spark.

The energy pulses are discharged at a high voltage or impedance level (that is, the impedance level is high in that the voltage is high and the current relatively low). These pulses are then transformed to a low voltage or low impedance level for aplication to the machining spark gap. The pulse energy is nonconductively conveyed so that a positive potential on the workpiece relative to the electrode tool is applied during each pulse but no potential is applied during the period between the pulses. The power of the energy pulse is high compared with the rating of the power source, and the charging or storage time, which is the period between pulses, is relatively long compared to the discharge or pulse duration.

The method of the invention additionally contemplates charging a plurality of capacitors during overlapping periods and sequentially discharging them to increase the pulse repetition rate. This simultaneous charging may suitably be accomplished by charging in one current direction through an inductor in a primary or high voltage circuit at a relatively slow current rate and discharging in the other current direction through the same inductor the same primary circuit at a much faster rate to produce the impulses in a secondary circuit coupled to the inductor.

The method of the invention further contemplates maintaining the gap width to utilize the available energy of the impulse. This is accomplished by feeding the electrode tool relative to the workpiece at a continuous rate to maintain substantially instantaneous initiation of the spark discharge, i. e., with minimum delay; upon application of the pulse voltage. The difference in delay times for initiation of the spark discharge at different gap spaces is utilized to effect the gap spacing control; the applied voltage being at a predetermined level somewhat above the voltage required for maintaining the spark discharge and the pulse duration being significantly small. By measuring the average value over the pulse period of one of the gap electrical parameters, the departure of the gap spacing from a desired or optimum width is indicated and by continuously adjusting the gap in accordance with the indicated signal level as further averaged over several pulse-to-pulse periods, the spacing is maintained as the spark machining proceeds.

In review it will be apparent that the applicant has found an improved method and apparatus for taking the energy from a continuously connected source and applying it to the spark gap in its most effective form—a series of short, time-spaced, substantially polarized impulses. The voltage of the impulses is maintained at a level high enough to initiate over-voltage spark-over of the gap between the electrode tool and workpiece of such short duration as to maintain only the characteristic spark discharge of spark machining from a cathodic tool to an anodic workpiece. The fixed time-spacing of the pulses assures separate discrete discharges without application of voltage to the spark gap electrodes during the period between successive pulses. Problems in forming the high-power repetitive pulses and applying them to the machining gap are met and the problem of unloading the pulse energy in the event that a machining spark cannot occur is likewise met. In one embodiment particularly the limits in the spark repetition rate imposed by the charging time of a single storage means system are overcome and greater spark machining speed is made possible. With the greater speed the automatically controlled feed system assures utilization of the energy thus supplied at the increased rate. The particular pulse characteristics of this system are themselves uniquely utilized in producing a measure of the working gap from the gap electrical parameters as the machining proceeds and the shortcomings of systems in which a gradually increasing voltage is applied directly to the gap are avoided with closer control as to both speed and uniformity.

I claim as my invention:

1. Apparatus for machining a conductive workpiece by application of a series of spark discharges to dislodge particles therefrom which comprises an electrode tool spaced from the workpiece to maintain a gap therewith, means for flooding the gap with a dielectric liquid, a capacitive energy storage means, a charging circuit connecting said storage means to a source of unidirectional voltage much higher than the gap sparkover voltage for charging the storage means in a given polarity, a discharge path consisting of a capacitor-discharging switch and a multi-turn inductor connected in circuit with said storage means, a cyclical switch operator for successively opening and closing the switch to provide uniformly spaced voltage pulses of uniform short time duration across said inductor, and a secondary discharge circuit means connecting the workpiece and electrode inductively coupled to said multi-turn inductor at a voltage step-down ratio with respect thereto to place the workpiece at an initial positive potential with respect to the electrode tool during each of said voltage pulses.

2. Apparatus for machining a conductive workpiece by application of a series of spark discharges to dislodge particles therefrom which comprises an electrode tool spaced from the workpiece to define a gap therewith, means for flooding the gap with a dielectric liquid, a capacitive energy storage means, a charging circuit connecting said storage means to a source of unidirectional voltage much higher than the gap sparkover voltage for charging the storage means in a given polarity, a discharge path consisting of a capacitor-discharging switch and a multi-turn inductor connected in circuit with said storage means, a cyclical switch operator for successively closing the switch for relatively short intervals and opening it for longer intervals to provide uniformly spaced voltage pulses of uniform short time duration across said inductor, and a secondary discharge circuit means connecting the workpiece and electrode inductively coupled to said multi-turn inductor at a voltage step-down ratio with respect thereto to place the workpiece at an initial positive potential with respect to the electrode tool during each of said voltage pulses prior to sparkover and subsequent material-dislodging current flow during each of such voltage pulses.

3. Apparatus for machining a conductive workpiece by application of a series of spark discharges to dislodge particles therefrom which comprises an electrode tool spaced from the workpiece to define a gap therewith with a self-restoring dielectric fluid therein, a storage capacitor, a pulse transformer with primary and secondary windings having a step-down turns ratio, a current-limiting charging impedance, means connecting said capacitor and said primary winding in series as an oscillatory network through said charging impedance to the terminals of a source of unidirectional voltage much higher than the gap sparkover voltage for charging the storage means in a given polarity, a capacitor-discharging switch, means connecting said switch across the series-connected capacitor and primary winding to discharge the capacitor in the primary winding and connect the charging impedance across the voltage source terminals when the switch is closed, means for repetitively opening and closing the switch to provide time-spaced voltage pulses of short-time duration across said primary winding, means connecting the workpiece and electrode to the terminals of said secondary winding to place the workpiece at an initial positive potential with respect to the electrode tool during each of said voltage pulses, and means for maintaining the spark gap spacing as the machining proceeds at a distance permitting sparkover and subsequent material-dislodging current flow during each of said voltage pulses.

4. In an apparatus for machining a conductive workpiece by a series of spark discharges through a liquid dielectric in the spark gap defined between the workpiece and an electrode tool, a pulse transformer with a ferromagnetic core having a multi-turn primary winding and a single turn secondary winding, low impedance conductors connecting said secondary winding across said gap, means for supplying a series of short, time-spaced pulses of given time duration to said primary winding, and a resistive impedance having a conductance which increases with applied voltage connected across said secondary winding in parallel with said gap to close the secondary circuit when the spark gap spacing is too large for sparkover at the secondary pulse voltage.

5. Apparatus for rapid controlled removal of particles from a conductive workpiece by application of a series of spark discharges thereto which comprises an electrode tool spaced from the workpiece to define a gap therewith, means for flooding the gap with a dielectric liquid, a storage capacitor, a pulse transformer having a multi-turn primary winding and a single turn secondary winding, a current-limiting charging impedance, means connecting said capacitor and said primary winding in series as an oscillatory network through said charging impedance to the terminals of a source of unidirectional voltage much higher than the gap sparkover voltage for charging the storage means in a given polarity, a capacitor-discharging high-speed rotary switch, means connecting said switch across the series connection of said capacitor and said primary winding to discharge the capacitor through the primary winding and connect the charging impedance across the voltage source terminals when the switch is closed, said switch when driven at a constant speed being closed for relatively short intervals and opened for longer intervals to provide time-spaced voltage pulses of short-time duration across said primary winding, means connecting the workpiece and electrode to the terminals of said secondary winding to place the workpiece at an initial positive potential with respect to the electrode tool during each of said voltage pulses, and means for maintaining the spark gap spacing as the machining proceeds at a distance permitting sparkover and subsequent material-dislodging current flow during each of said voltage pulses.

6. In an apparatus for machining a conductive workpiece by the application of a series of spark discharges through a liquid dielectric in the spark gap defined between the workpiece and an electrode tool, means for applying a series of uniform time duration and uniformly time-spaced voltage impulses of given applied amplitude to the gap, an averaging network responsive to the average value of the voltage across the gap, and means responsive to said network for moving the electrode tool relative to the workpiece to maintain a spark gap spacing, said averaging network comprising a resistance and capacitance network having a charging time constant larger than the pulse duration but smaller than the period between pulses and a discharging time constant larger than the period between pulses.

7. In an apparatus for machining a conductive workpiece by the application of a series of spark discharges through a liquid dielectric in the spark gap defined between the workpiece and an electrode tool, a timed pulse forming system comprising a plurality of capacitors connected in parallel to an energy source, switching means for discharging said storage means sequentially through a primary winding of a pulse transformer with a time interval between successive discharges, and means for connecting the secondary winding of said transformer to the electrode tool and workpiece, said secondary winding being connected to provide an initial positive potential on said workpiece with respect to said electrode to initiate sparkover and material-dislodging current flow during each pulse, and means for damping succeeding oscillatory voltages after the said positive of each pulse.

8. In an apparatus for machining a conductive workpiece by the application of a series of spark discharges through a liquid dielectric in the spark gap defined between a workpiece and an electrode tool, a plurality of capacitors, means for connecting each of said capacitors to an electrical energy source through separate impedance branches of a charging network, a periodic sequential switch and an inductor connected between a common terminal of said capacitive storage means and their individual connections to the branches of said charging network, and discharge coupling means comprising a pulse transformer having said inductor as its primary winding and having its secondary winding connected to said workpiece and said tool.

9. In an apparatus for machining a conductive workpiece by the application of a series of spark discharges through a liquid dielectric in the spark gap defined between the workpiece and an electrode tool, a timed pulse forming system adapted to be continuously connected to an electrical energy source through a charging network comprising a plurality of capacitors in series with a common inductor connected for charging through said network, a switch means for sequentially connecting said inductor across each of said capacitors at periodic time-spaced intervals, and a coupling discharge circuit including a pulse transformer with a step-down turns ratio having said inductor as its primary winding and having its secondary winding connected between said workpiece and said electrode tool.

10. In an apparatus for machining a conductive workpiece by a series of spark discharges through a liquid dielectric in the spark gap defined between the workpiece and an electrode tool, a timed pulse forming system comprising a plurality of capacitors in series with a common inductor and adapted to be coupled to an electrical energy source through a charging network, a rotary spark gap switch for sequentially connecting each of said storage means across said inductor, a discharge circuit including a pulse transformer with a step-down turns ratio having said inductor as its primary winding and having its secondary winding connected between said workpiece and said electrode tool to initiate spark discharge therebetween at a lower voltage level, and damping means in said discharge circuit to attenuate oscillatory impulses following the initial current pulse in said inductor.

11. In an apparatus for machining a conductive workpiece by a series of spark discharges through a liquid dielectric in the spark gap defined between the workpiece and an electrode tool, a timed pulse forming system comprising a plurality of capacitors in series with a common inductor and adapted to be coupled to an electrical energy source through a charging network having separate impedance branches connected to the respective capacitors, a rotary spark gap switch for short circuiting each of said capacitors across said inductor, said switch having a plurality of spaced stator electrodes each connected to one of said storage means and a plurality of rotor electrodes connected in common to said inductor and spaced to provide a substantially uniform sparking sequence between the respective stator electrodes and respective electrodes of the rotor, a discharge circuit including said spark gap inductively coupled to said inductor, and means for dissipating all of each capacitor energy charge during each closed period of the switch.

12. In an apparatus for machining a conductive workpiece by a series of spark discharges through a liquid dielectric in the spark gap defined between the workpiece and an electrode tool, a timed pulse forming system adapted to be coupled to an electrical energy source through a plural branch charging network comprising a plurality of capacitors connected to a common inductor, a rotary spark gap discharge initiating switch for sequentially connecting each of said capacitors across said inductor and a pulse transformer having said inductor as its primary winding and having its secondary winding connected between said workpiece and said electrode tool, said switch having a plurality of stator electrodes each connected to one of said capacitors and a larger plurality of rotor electrodes connected in common to said inductor and spaced to provide sequential discharge sequence from the respective stator electrodes to the rotor electrodes also in sequence to distribute the switch electrode erosion.

13. In an apparatus for machining a conductive workpiece by the application of a series of spark discharges through a liquid dielectric in the spark gap defined between the workpiece and an electrode tool, a capacitor, a pulse transformer having a primary winding and a secondary winding with a step-down turns ratio, a timed switch periodically closed for a given pulse period, means connecting said primary winding of said transformer and said capacitor in series with a unidirectional energy source through a charging impedance to charge the capacitor, and means connecting said capacitor means and said switch in series with said primary winding to discharge the storage means in said pulse period, said secondary winding being connected across said gap and said transformer having a saturable core to permit dissipation of the stored energy during the pulse period in the event no spark gap discharge occurs.

14. In electrospark machining apparatus, a series work cutting circuit comprising a conductive workpiece, an electrode tool spaced therefrom by an over voltage rupturable self-restoring liquid dielectric to define a spark gap and the secondary winding of a step-down pulse transformer; a transformer pulsing circuit including in series a capacitor, the primary winding of said transformer, and a switching means adapted cyclically to close for a relatively brief period and open for a longer period; and a tuned charging circuit connecting said storage means in series with a direct current energy source including an inductance, a unidirectionally conductive means and the said capacitive storage means, the said inductance and capacitance being so related in values as to effect charging of said capacitance to a potential higher than said source in a time less than each open circuit period of said switching means.

15. In an apparatus for machining a conductive workpiece by a series of spark discharges through a liquid dielectric in the spark gap defined between the workpiece and an electrode tool, a timed pulse forming system comprising a plurality of capacitors in series with a single inductor having a ferromagnetic core, separate charging impedance branches for connecting said capacitors together with said inductor to a power source, a rotary spark gap switch for sequentially and periodically discharging each one of said capacitors into said inductor, whereby the inductor core is magnetized in the opposite direction than produced by the charging current of the capacitors, a pulse transformer with a step-down turns ratio having said inductor and core as its primary winding core and having its secondary winding connected between said workpiece and said electrode tool to initiate spark discharge therebetween at a lower voltage level, and unidirectional damping means shunting said inductor to attenuate oscillatory impulses following the initial current pulse in said inductor, said damping means having a resistance higher than the impedance presented by the inductor to the charging current.

16. In an apparatus for machining a conductive workpiece by a series of spark discharges through a liquid dielectric in the spark gap defined between the workpiece and an electrode tool, a timed pulse forming system comprising a plurality of capacitors in series with a common inductor adapted to be coupled to an electrical energy source through a charging network, a rotary spark gap switch for sequentially and periodically connecting each of said capacitors across said inductor to initiate discharge of the capacitors, and a pulse transformer with a step-down turns ratio having said inductor as its primary winding and having its secondary winding connected between said workpiece and said electrode tool for providing an induced voltage pulse thereto upon discharge of each capacitor at a lower voltage level, said transformer having a core saturable when a secondary discharge does not occur to permit the dissipation of the capacitor energy during the closed period of the switch.

17. In an apparatus for machining a conductive workpiece by a series of spark discharges through a liquid dielectric in the spark gap defined between the workpiece and an electrode tool, a timed pulse forming system comprising a plurality of capacitors in series with a common inductor adapted to be coupled to an electrical energy source through a charging network, a rotary spark gap switch for sequentially and periodically connecting each of said capacitors across said inductor to initiate discharge of the capacitors, a pulse transformer with a step-down turns ratio having said inductor as its primary winding and having its secondary winding connected between said workpiece and said electrode tool for providing an induced voltage pulse thereto upon discharge of each capacitor at a lower voltage level, said transformer having a core saturable when a secondary discharge does not occur to permit the dissipation of the capacitor energy during the closed period of the switch, and unidirectional conducting means connected across the inductor to attenuate oscillatory impulses following the initial discharge in said inductor.

(References on following page)

References Cited in the file of this patent

UNITED STATES PATENTS

| | | |
|---|---|---|
| 1,989,546 | Chapman | Jan. 29, 1935 |
| 2,165,065 | Marbury | July 4, 1939 |
| 2,179,105 | Sidney | Nov. 7, 1939 |
| 2,394,535 | Dawson | Feb. 12, 1946 |
| 2,451,496 | Klemperer | Oct. 19, 1948 |
| 2,508,103 | Dawson | May 16, 1950 |
| 2,526,423 | Rudorff | Oct. 17, 1950 |
| 2,628,330 | Williams | Feb. 10, 1953 |

FOREIGN PATENTS

| | | |
|---|---|---|
| 420,100 | Great Britain | Nov. 26, 1934 |
| 519,353 | Great Britain | Mar. 21, 1940 |
| 637,793 | Great Britain | May 24, 1950 |